(12) United States Patent
Lutzka et al.

(10) Patent No.: US 11,331,989 B2
(45) Date of Patent: *May 17, 2022

(54) TONNEAU COVER ACCESS PANEL

(71) Applicant: Bestop, Inc., Louisville, CO (US)

(72) Inventors: Tavis Lutzka, Rochester Hills, MI (US); Stephen J. Lewis, Harrison Township, MI (US); David A. Smith, Macomb Township, MI (US)

(73) Assignee: Bestop, Inc., Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/859,195

(22) Filed: Apr. 27, 2020

(65) Prior Publication Data

US 2020/0254860 A1  Aug. 13, 2020

Related U.S. Application Data

(63) Continuation of application No. 16/271,437, filed on Feb. 8, 2019, now Pat. No. 10,668,795, which is a continuation of application No. 15/487,037, filed on Apr. 13, 2017, now Pat. No. 10,239,394, which is a continuation-in-part of application No. 15/342,761, filed on Nov. 3, 2016, now Pat. No. 10,363,801.

(Continued)

(51) Int. Cl.
*B60J 7/14* (2006.01)
*B60J 7/10* (2006.01)
*B60J 7/185* (2006.01)
*B60J 7/08* (2006.01)

(52) U.S. Cl.
CPC ............... *B60J 7/141* (2013.01); *B60J 7/085* (2013.01); *B60J 7/102* (2013.01); *B60J 7/185* (2013.01); *B60Y 2304/03* (2013.01); *B60Y 2304/05* (2013.01)

(58) Field of Classification Search
CPC ... B60J 7/141; B60J 7/102; B60J 7/185; B60J 7/085
USPC ....................................... 296/100.15, 100.16
See application file for complete search history.

(56) References Cited

U.S. PATENT DOCUMENTS 4,813,734 A * 3/1989 Hoover .................... B60J 7/102
                                              296/100.17
5,263,761 A * 11/1993 Hathaway ................ B60J 7/104
                                              296/100.18

(Continued)

*Primary Examiner* — Joseph D. Pape
(74) *Attorney, Agent, or Firm* — Warn Partners, P.C.

(57) ABSTRACT

A tonneau cover access panel assembly connectable to a vehicle that eliminates the need for side rails to both locate and tension a tonneau cover. The assembly also reduces weight and complexity. The assembly incorporates a readily accessible rear latching system that reduces or eliminates interference with the tonneau cover during operation. The assembly also incorporates a tonneau cover tensioning system. The tension seals out environmental elements and holds the tonneau cover and locating bows in place. The assembly holds the tonneau in the closed tension state keeping the tonneau cover secured and tight until the cover is opened by an operator. The assembly is movable between a closed position and a fully open/stowable position and any intermediate positions. The assembly is also movable between at least a first open position and the deployed position for more limiting access to the cargo bed of the vehicle when desired.

20 Claims, 26 Drawing Sheets

Related U.S. Application Data

(60) Provisional application No. 62/250,290, filed on Nov. 3, 2015.

(56) References Cited

U.S. PATENT DOCUMENTS

| | | | | |
|---|---|---|---|---|
| 6,257,647 | B1* | 7/2001 | Ninness | B60J 7/102 160/290.1 |
| 6,322,129 | B2* | 11/2001 | Huotari | B60J 7/10 296/100.15 |
| 6,948,760 | B2* | 9/2005 | Marx | B60J 7/062 296/100.12 |
| 10,239,394 | B2* | 3/2019 | Lutzka | B60J 7/102 |
| 2004/0195858 | A1* | 10/2004 | Martin | B60P 7/0876 296/100.12 |
| 2011/0169296 | A1* | 7/2011 | Schrader | B60J 7/104 296/100.15 |
| 2012/0025560 | A1* | 2/2012 | Huotari | B60J 7/068 296/100.13 |
| 2016/0304024 | A1* | 10/2016 | Beltowski | B60J 7/12 |
| 2017/0120736 | A1* | 5/2017 | Lutzka | B60J 7/141 |

* cited by examiner

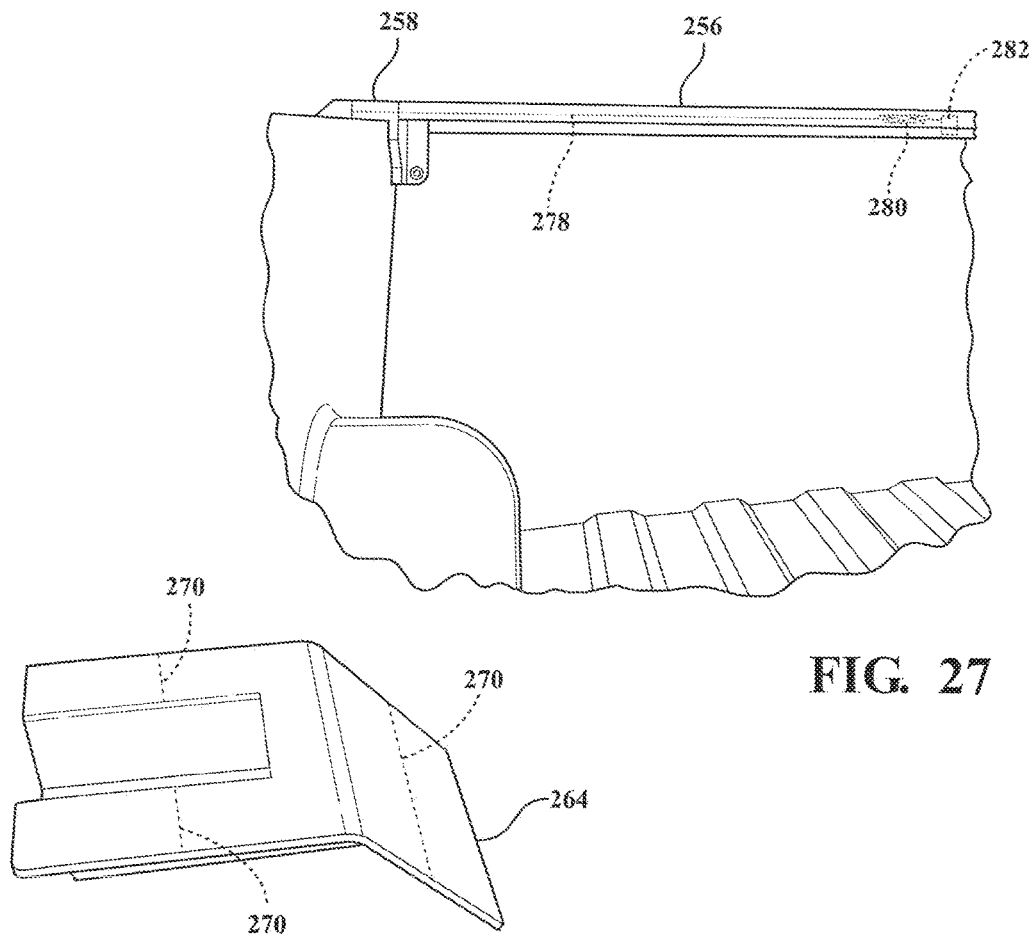
FIG. 27
FIG. 28A
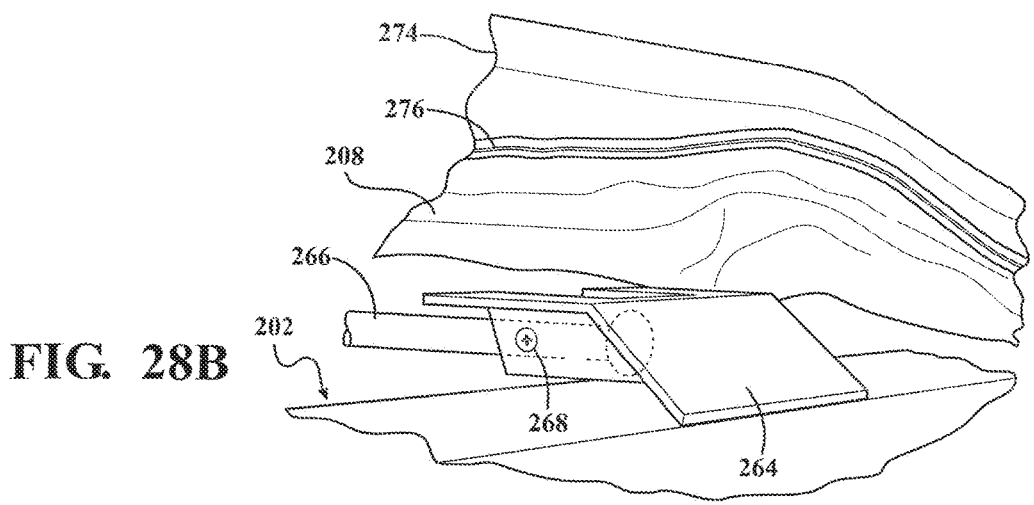
FIG. 28B

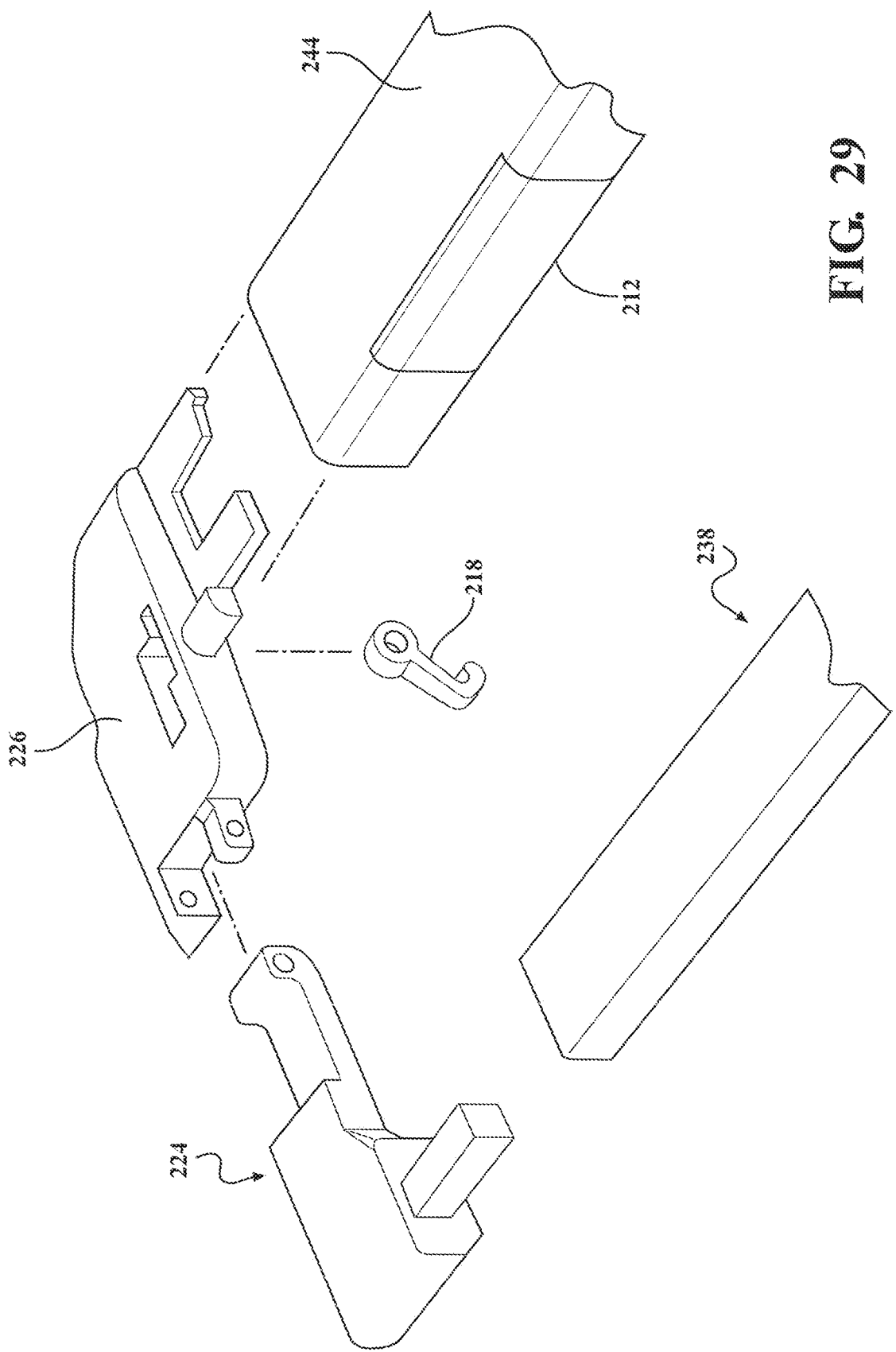

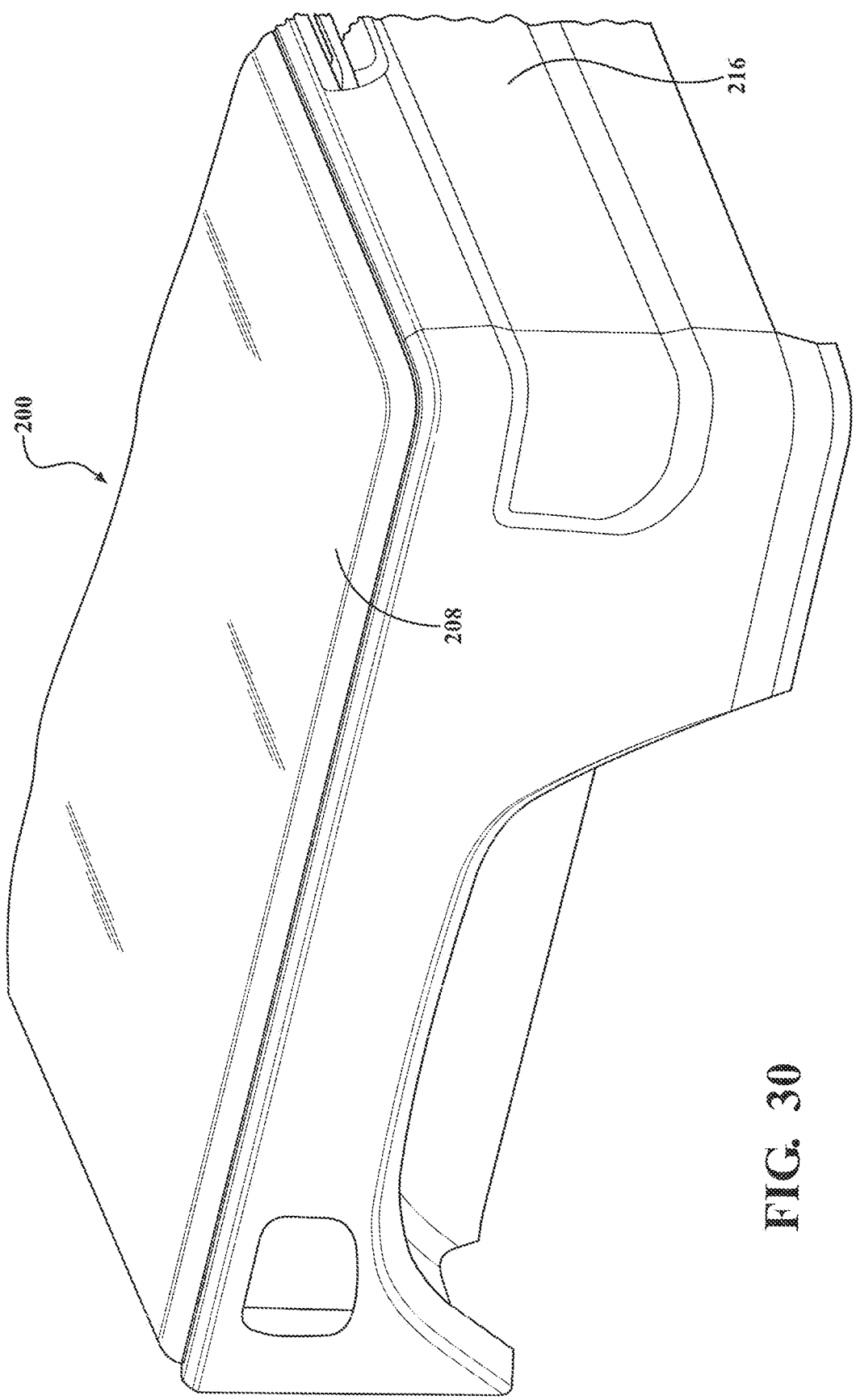

TONNEAU COVER ACCESS PANEL

CROSS REFERENCE TO RELATED APPLICATIONS

The instant application is a continuation of U.S. patent application Ser. No. 16/271,437, filed Feb. 8, 2019, which is a continuation of U.S. patent application Ser. No. 15/487,037, filed Apr. 13, 2017, now U.S. Pat. No. 10,239,394, issued Mar. 26, 2019, which is a continuation-in-part of U.S. patent application Ser. No. 15/342,761, filed on Nov. 3, 2016, now U.S. Pat. No. 10,363,801, issued Jul. 30, 2019, which claims benefit of U.S. Provisional Application No. 62/250,290, filed Nov. 3, 2015. The disclosures of the above applications are incorporated herein by reference.

FIELD OF THE INVENTION

The present invention relates to a pivotable bed cover closeout device for a cargo bed of a vehicle which is movable to desired positions.

BACKGROUND OF THE INVENTION

Removable or stowable soft tonneau covers for pickup vehicles are known in the art. These tonneau covers provide a vehicle with access to the cargo bed when the cover is pulled/folded back or removed, or, provides protection from the elements with the tonneau cover on/deployed. Such tonneau covers are typically manually unlatched on both sides before being moved into the desired positions.

Currently, tonneau covers have a rail that must be mounted down each side of the pickup box to give the cover a place to attach and seal out the elements. Typically, the rails are aluminum and/or the cover is a fabric cover. These side rails also act as a locator, aligning the bows/top cover as it is installed and positioned and provide a way to tension the top cover. Having to install these rails leads to additional height on the vehicle, cost, a non-cohesive look, and addition weight/complexity in the top.

There are other tonneau systems that are labeled as "low profile" to help fight the height and non-cohesive look. However, these covers still use an additional rail to mount the cover to the pickup bed and gain fabric tension so the design is no different than a "conventional" tonneau cover, it is just a different geometry.

Therefore, there remains a need for a system that eliminates the need for side rails, that utilizes an add-on bracket and/or an integrated bed design as an attachment method, eliminates the need of an additional attachment to gain tonneau cover tension, and provides easy multiple position accessibility into the cargo bed.

SUMMARY OF THE INVENTION

A tonneau cover assembly incorporating a cable-type system or any other type of suitable system that tensions a top cover, providing tension along the side of the cover to seal the cover to a bedside of a vehicle. When cables are used, the cables running down either side of the cover solves many of the aforementioned issues. Using a cable running fore and aft on the pickup truck or sport utility (SUV) vehicle bedside eliminates the need for the side rails to both locate and tension the top cover. The cable tension works to seal out the elements and holds the tonneau cover and bows in place.

With a rear engagement feature according to an embodiment of the present invention, it is readily implementable both as an add on bracket or as an integrated feature in a pickup truck bed or SUV or adapted to any other vehicle type. A rear latching system holds the tonneau in the closed tension state keeping the tonneau secured and tight until the cover is opened by an operator.

Optionally, an integrated boot cover is also sewn into the top cover at the front so that when the tonneau cover is rolled up in the stowed position, the boot cover can wrap and protect the top cover.

Preferably, according to an embodiment of the present invention, pockets are provided to hold the ends of center management bows to set the height and eliminate aluminum rails and attachment features. When the top cover is fabric or other flexible material these pockets, e.g., made of acrylonitrile butadiene styrene (ABS) having predetermined suitable thickness, are preferably sewn to the underside surface of the cover.

The tonneau cover assembly is mounted at a predetermined location in sealing engagement with a tailgate and is pivotable between at least a closed position sealing off with the vehicle tailgate, and a partially open position folded rearward to gain access into the cargo bed. When in the partially open position the opening into the bed is limited to provide the predetermined desired amount of accessibility to the bed, e.g., creates about a 6 inch opening for access. This has significant benefits, including, security, ease of stowing and accessing items near the tailgate, eliminating the need to fully open the tailgate and/or move the entire cover to access the bed, quicker access to the bed, and expedient cargo holding, e.g., hauling longer items such as wood planks extending through the opening and into the cargo bed. Intermediate open position(s) is/are also contemplated.

The tonneau cover assembly is also movable between the closed position, partially open position, and a fully open position for full access to the cargo area, according to an embodiment of the present invention. Intermediate position(s) is/are also contemplated.

The tonneau cover assembly reduces weight and complexity, and eliminates the side rails when compared to current tonneau systems.

According to another embodiment of the present invention, at least one release lever of the rear latching system is mounted in a convenient location for easier access to pull the release lever generally toward the operator for releasing the latching mechanism, when desired. The release lever location(s) reduces or eliminates interference with the cover to operate. The cable system runs fore and aft, and additionally has cable tensioning along the front of the system.

Using a cable running fore and aft on the pickup truck or sport utility (SUV) vehicle bedside eliminates the need for the side rails to both locate and tension the top cover. The cable tension works to seal out the elements and holds the tonneau cover and bows in place.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 27 is a front elevation view of a front portion of the assembly depicted in FIG. 21, according to the present invention;

FIG. 28A is a perspective view of a bow pocket that is connectable to the cover of the assembly, according to an embodiment of the present invention;

FIG. 28B is an exploded perspective view of the bow pocket connected to a bow, and a section taken of the cover that is connectable to the bow pocket, according to an embodiment of the present invention;

FIG. 29 is a partial exploded left hand perspective view depicting some of the connecting features of the rear attachment assembly, according to the present invention;

FIG. 30 is a perspective view of the tonneau cover access panel assembly depicted in an environment of use on a vehicle shown in a closed position, according to an embodiment of the present invention;

DETAILED DESCRIPTION OF THE PREFERRED EMBODIMENTS

Figure 1:
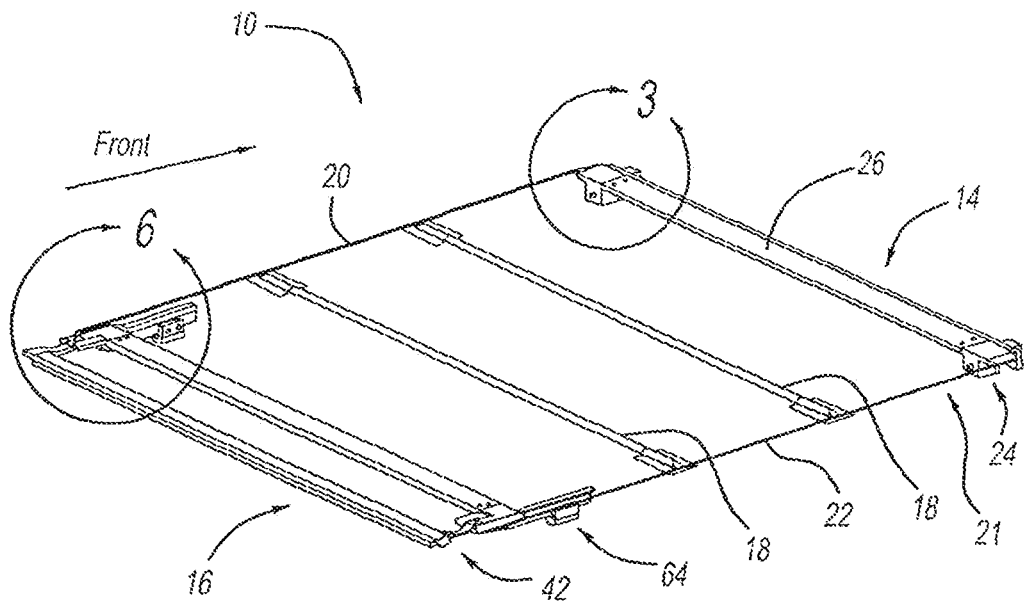
FIG. 1 is a right hand perspective view of a tonneau cover assembly according to the present invention, with the cover material omitted for clarity.
Figure 2:
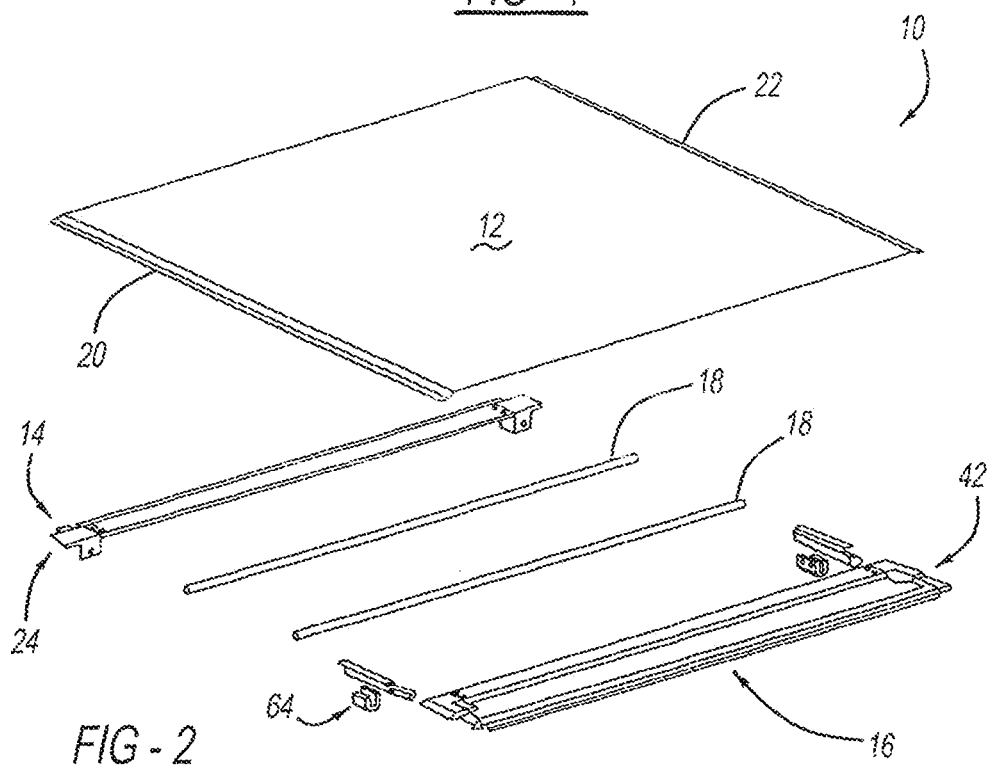
FIG. 2 is a partially exploded view of the tonneau cover assembly of FIG. 1 shown from the left side, in accordance with the present invention.

The following description of the preferred embodiment(s) is merely exemplary in nature and is in no way intended to limit the invention, its application, or uses.

Referring to FIGS. 1-8 generally, there is provided a rear attachment assembly (or "tonneau cover access panel assembly") shown generally at 16 illustrated with an exemplary tonneau cover assembly shown generally at 10 that is a cable-type system. The tonneau cover assembly has a cover 12, e.g., fabric material, soft or flexible material, vinyl or any other suitable material and combinations thereof depending on the application. The tonneau cover assembly 10 also has a front attachment assembly 14, and a at least one, preferably, a plurality of cover management bows 18. These cover management bows 18, most preferably, two bows, are center fabric management bows located between the front attachment assembly 14 and rear attachment assembly 16 running cross bed. For example, the bows 18 help manage the movement of the cover 20 to fold during stowage, etc.

The tonneau cover assembly 10 is provided with a cable tensioning system including at least a first tension cable 20 and a second tension cable 22. The cables are of the same or different predetermined suitable type(s) and diameter(s) for providing predetermined tension and tension release forces, dependant on the application. Other tensioning systems are contemplated depending on the application without departure from the scope of the present invention.

The front attachment assembly 14 includes a pair of front attachment portions 24 each connected to the respective ends of a first bow 26 that is a front bulkhead bow. The front attachment blocks 24 provide a no drill attachment toward the bulkhead of the cargo bed. An attachment arm 28 is operably connected to either of the front attachment blocks 24 for attaching the front of the assembly 10, as will be explained in greater detail below. A cable attachment feature 30, e.g., with a first aperture, is formed in either of the front attachment blocks 24 allowing for mounting locations for the cable tensioning system. The first aperture preferably is formed on this outward feature of both of the front attachment blocks 24 for connecting both the first and second tension cables 20, 22. The attachment arm 28 sets side-to-side and draws the attachment arm 28 to the front. Preferably, the attachment arm 28 slides on and a fastener, e.g., screw, draws the attachment arm 28 to the front, in the direction of the cab.

Figure 3:
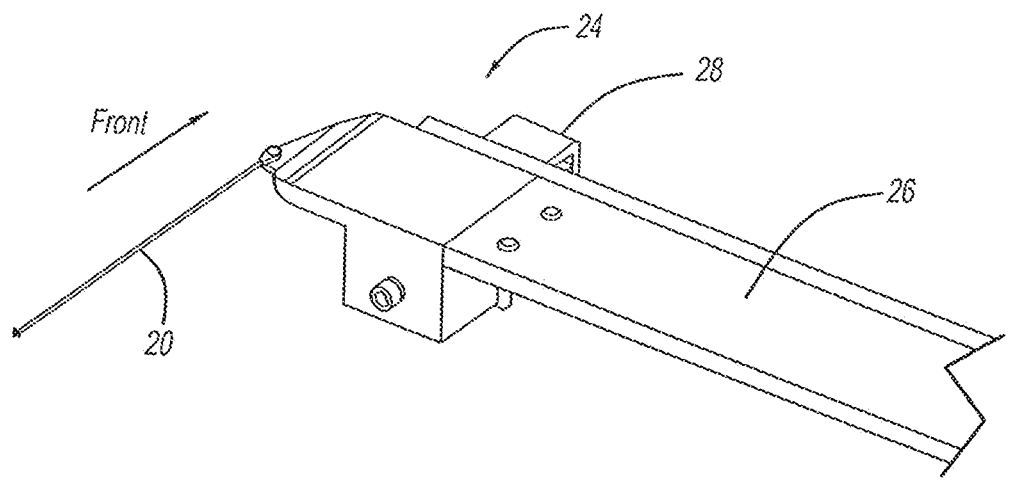
FIG. 3 is an enlarged rear perspective view of a front attachment assembly connected to a first bow and a first tension cable of FIG. 1, in accordance with the present invention.
Figure 4:
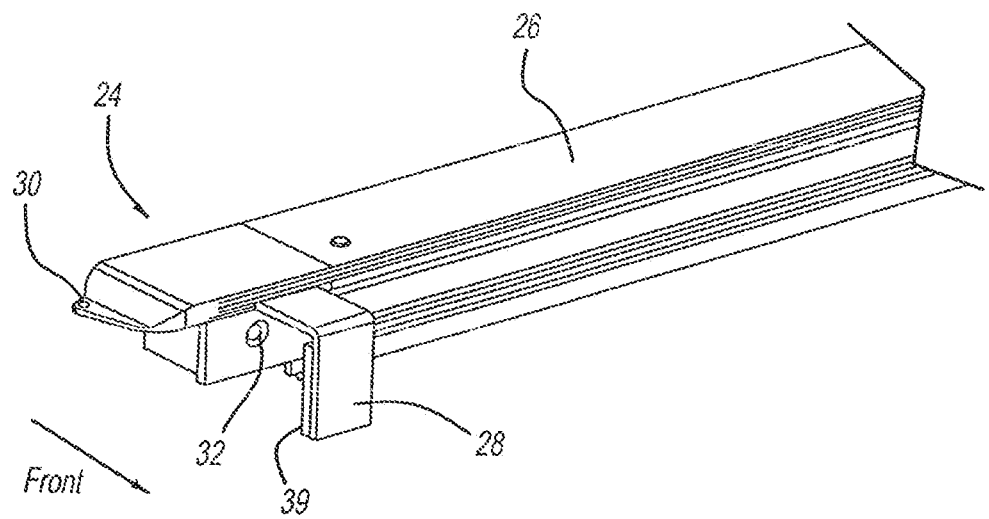
FIG. 4 is an enlarged front perspective view of the front attachment assembly connected to the first bow, in accordance with the present invention.
Figure 5:
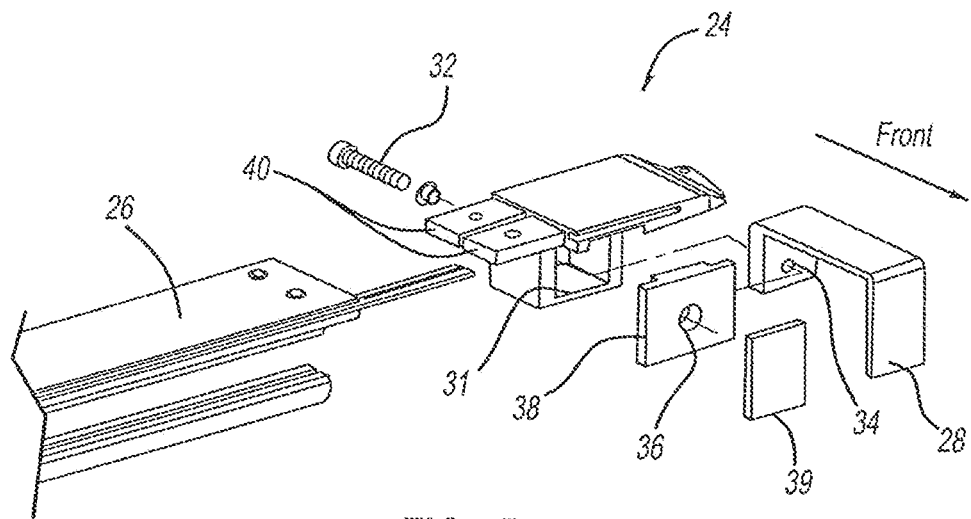
FIG. 5 is a partially exploded front view of the front attachment assembly of FIGS. 3-4 and the first bow, in accordance with the present invention.
Figure 6:
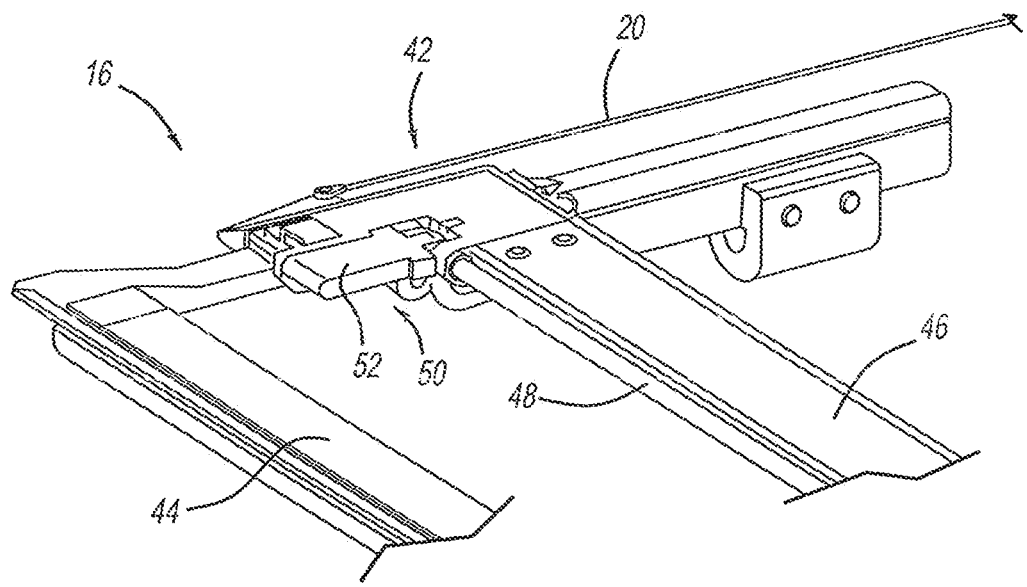
FIG. 6 is an enlarged view of a segment of a rear attachment assembly from FIG. 1 including a rear attachment block connected to a release latch mechanism, in accordance with the present invention.
Figure 7:
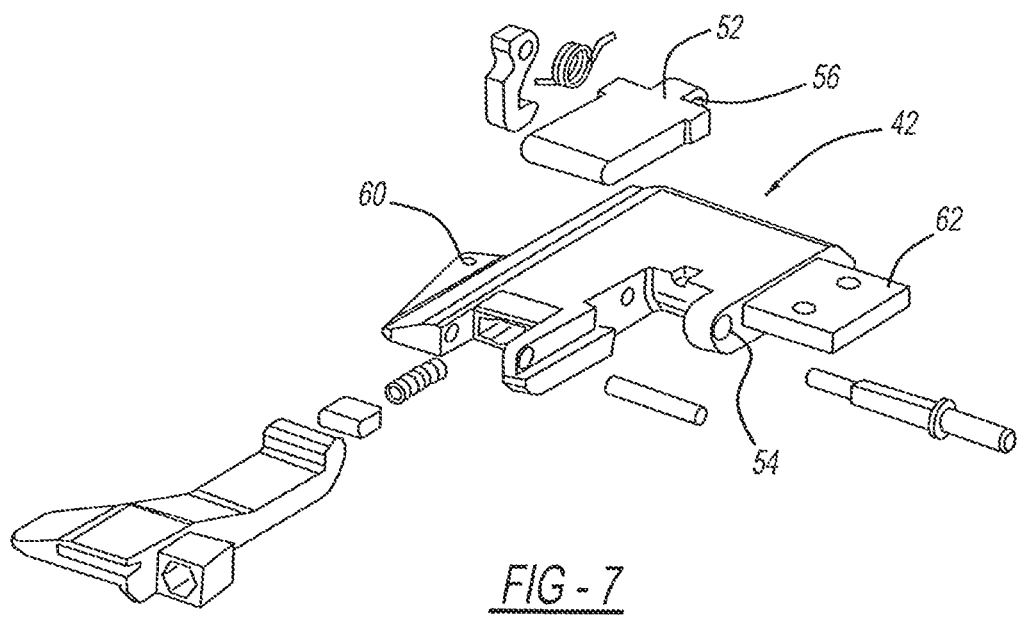
FIG. 7 is an exploded view of the rear attachment block and partial opening feature.

Referring to the Figures generally, and more particularly to FIGS. 3-5, in a preferred embodiment, the attachment arm 28 is generally U-shaped, with two lower depending arms, and is sized to partially fit within an opening 31 formed in the front attachment blocks 24. At least one first fastener 32, e.g., an attachment bolt, is extendable through at least a second aperture 34 provided on one of the lower depending arms of the attachment arm 28 and a third aperture 36 formed in a first brace 38. A second brace 39 is held, e.g., using adhesive, against the inside of the other arm for mounting to the vehicle. Thus, once the first bow 26, or "front bulkhead" referred to interchangeably herein, is put in place on the vehicle and then the fastener 32 is tightened, this draws the attachment arm 28 rearward fixing and sealing the front bulkhead 26 to the bulkhead of the vehicle's bed. In a preferred embodiment, at least one seal is provided on the front attachment assembly 14 and typically seals against the vehicle structure.

The first pair of front attachment blocks are also provided with at least one first mounting bracket 40, preferably two side-by-side, to connect to the first bow 26. In a preferred embodiment, the first mounting brackets 40, 40 slide into the ends of the first bow 26 and fasteners, e.g., bolts, are provided to fix the first bow 26 to the brackets 40, 40.

Referring to the Figures generally, and more particularly to FIGS. 1-2 and 6-7, the rear attachment assembly 16 allows tension to be applied using the cable tension system, eliminating the need for side rails to seal the tonneau cover 12 to the vehicle bed. A pair of rear attachment blocks 42, or "rear tension block" referred to interchangeably herein, are both operably connected to a rear bar 44, cross member 46, and a connector bar 48, which is a release latch connector bar forming part of a release latch mechanism indicated generally at 50. The release latch mechanism 50 has a pair of release latches 52 operably connected to respective rear attachment blocks 42.

Both the right and left hand release latches 52 are tied together so that only one side needs to be operated to open both latches 52. A fourth aperture 54 or a boss is provided on the block of the rear attachment blocks 42 and aligns with a fifth aperture 56 or a boss provided on the release latches 52 for receiving the connector bar 48.

A second cable attachment feature 60, e.g., with a sixth aperture, is formed in either of the rear attachment blocks 42 allowing for mounting locations for the cable tensioning system. The sixth aperture preferably is formed on an outward feature of both of the rear attachment blocks 42 for connecting both the first and second tension cables 20, 22.

The pair of rear attachment blocks 42 are also provided with at least one second mounting bracket 62 to connect to the ends of the cross member 46. In a preferred embodiment the second mounting brackets 62 slide into the ends of the cross member 46 and at least one fastener, e.g., bolts, are provided to fix the cross member 46 to the brackets 62.

Optionally, a pair of rear mounting brackets indicated generally at 64 (see FIGS. 1-2) are used.

Figure 8:
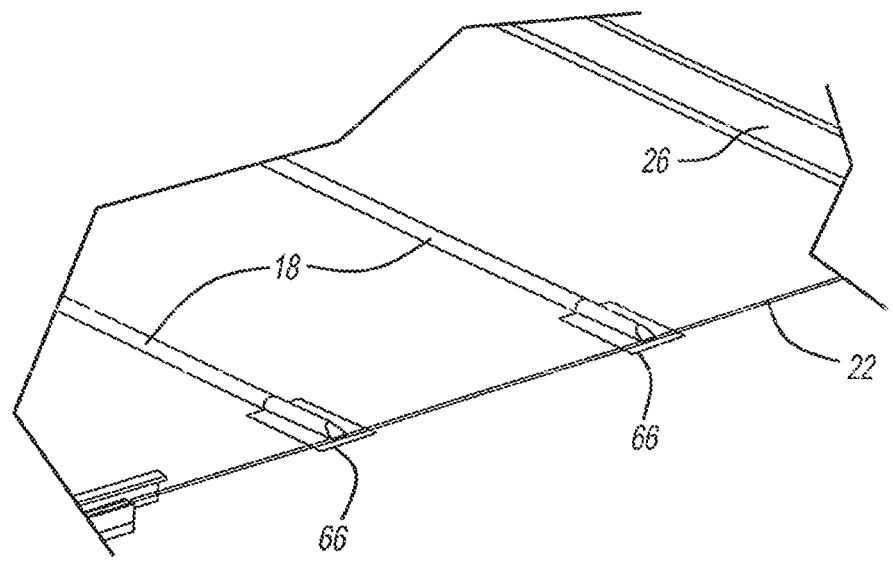
FIG. 8 is an enlarged rear perspective view of a portion of FIG. 1 showing one end of each of a pair of cover management bows pockets.
Figure 9:
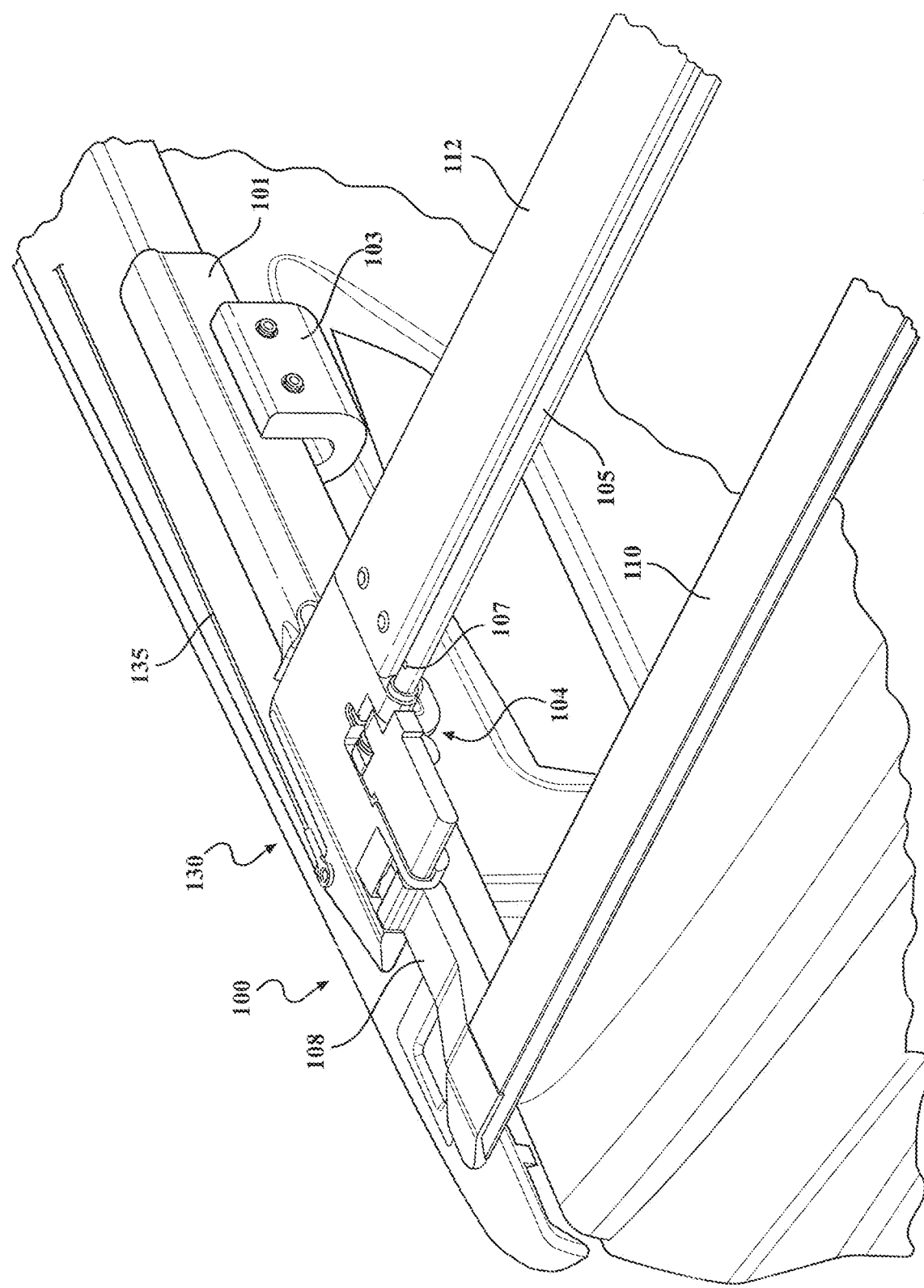
FIG. 9 is a perspective view of a tonneau cover access panel assembly, shown in an exemplary environment of use with the cover material omitted for clarity, according to an embodiment of the present invention.
Figure 10:
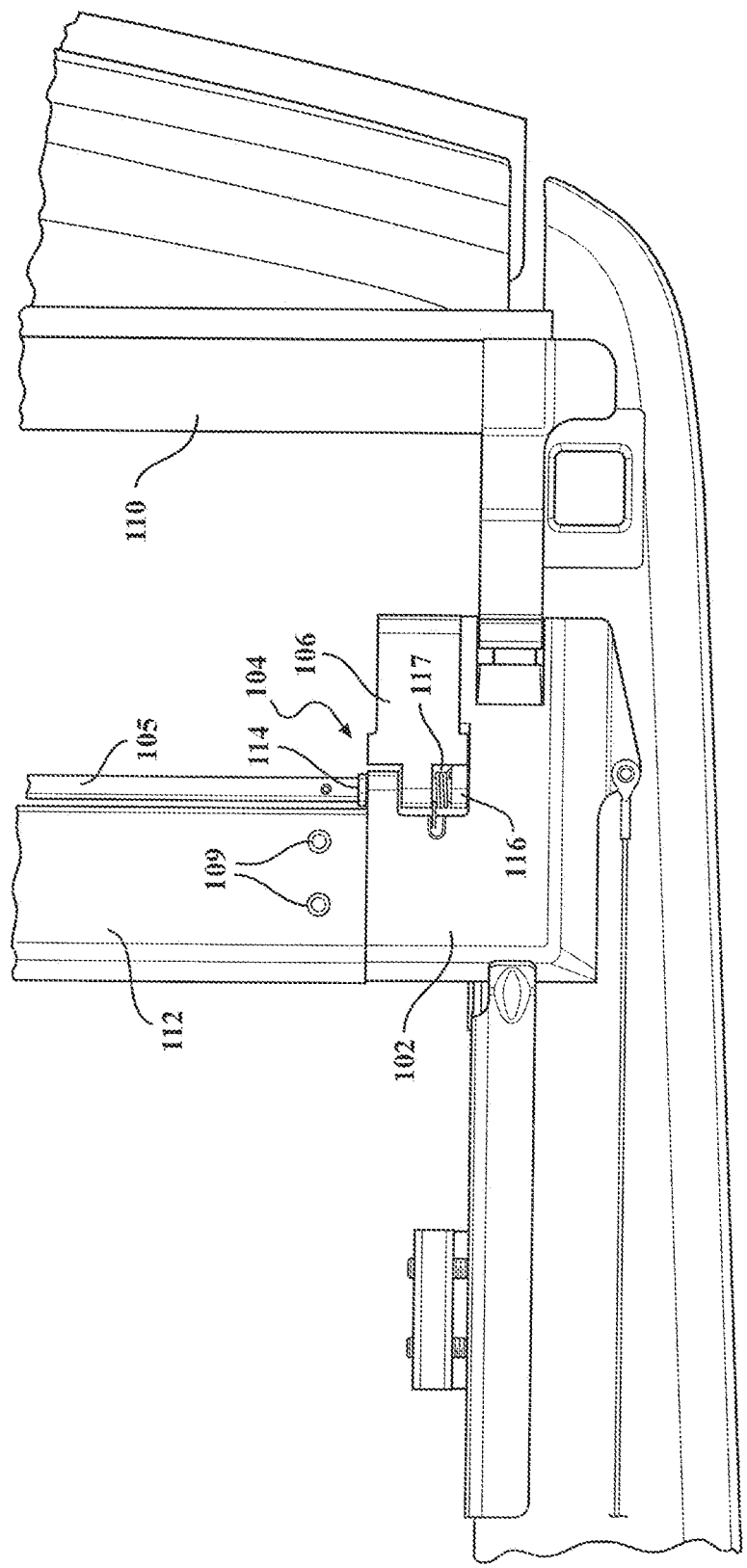
FIG. 10 is a top plan view of the tonneau cover access panel assembly, according to the present invention.
Figure 11:
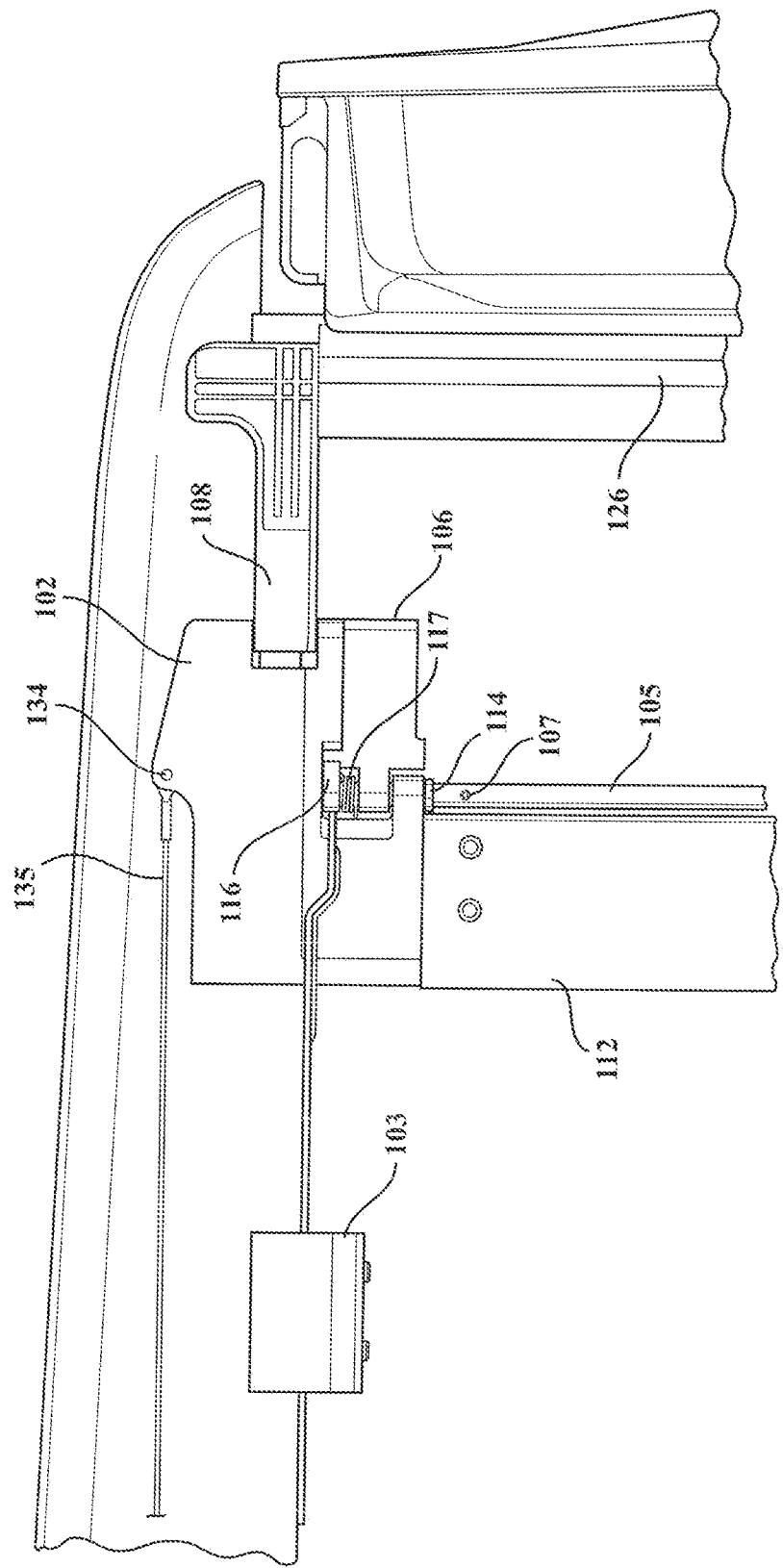
FIG. 11 is a bottom plan view of the tonneau cover access panel assembly, according to the present invention.
Figure 12:
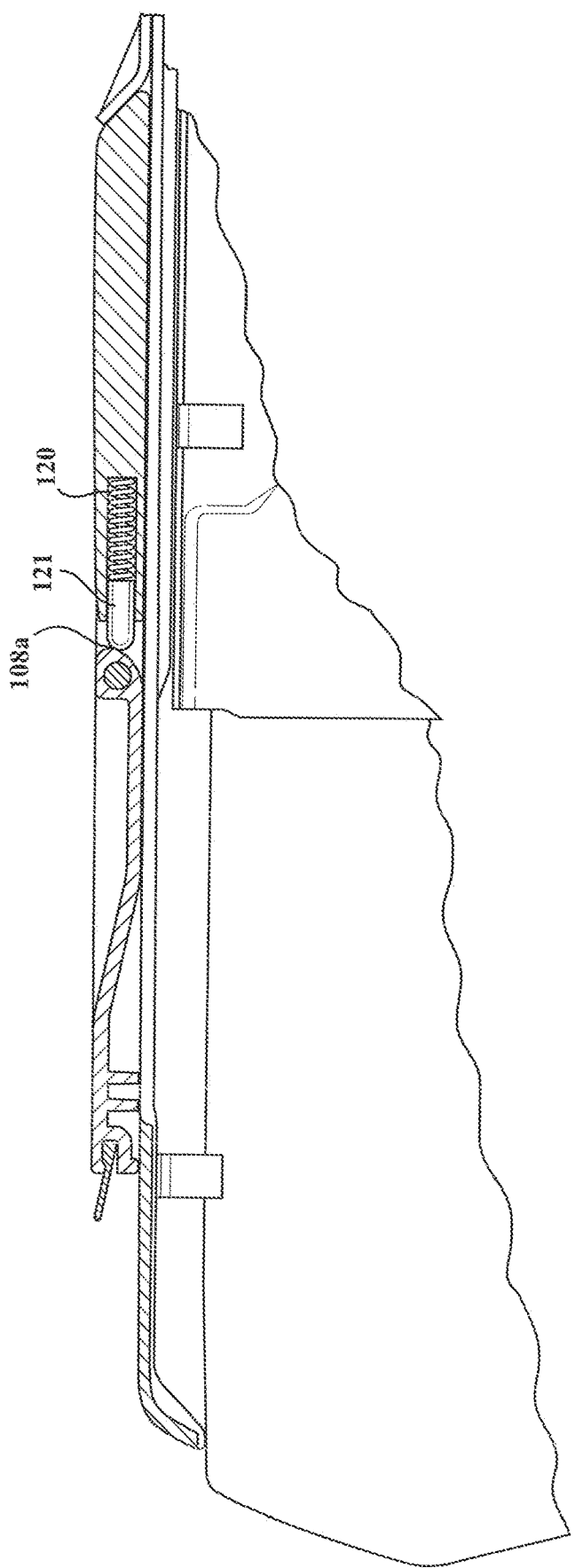
FIG. 12 is a side elevation sectional view of the tonneau cover access panel assembly in a closed position, showing a spring loaded detent, according to the present invention.

Referring to the Figures generally, and more particularly to FIG. 8, where the vehicle and bedrails are omitted for clarity, either of the cover management bows 18 are provided with operably profiled/configured ends for preventing undesirable movement on the existing bed rails. Using a flat edge 66, the ends touch off on the vehicle bed rails setting the height of the bows 18/cover 12. The flat edge 66 sits substantially flat on top of the bedrail such that the bows 18 cannot drop into the bed of the vehicle. An operable predetermined step feature formed in the bottom of the ends helps to set side to side positioning against the vehicle bed sides. By way of example, a step on the bottom drops in and sits just inside the bedrail such that the end cannot move too far either side.

Referring to FIGS. 1-8 generally, the tonneau cover assembly 10 eliminates side rails from the system. In accordance with a preferred embodiment of the present invention, the cable tensioning system incorporates cables 20, 22 used to create cover 12 tension and seal the cover 12 to the vehicle body. The assembly 10 uses the bedside to locate the fabric management bows 18, 18 and cover 12 in their side to side and height orientations. The rear engagement feature, e.g., rear mounting brackets 64, can be an additional bracket (as shown) or incorporated into the bed. The front engagement to the bed feature, e.g., attachment arms 28, are drawing up on the bulkhead to locate/attach/seal. The assembly 10 preferably includes an integrated fabric boot cover to protect the stowed system when rolled and stowed. Depending on the application, alternative stowing methods are contemplated without deviation from the present invention. A significant advantage over conventional systems is the use of connected right and left hand latches 52, 52 on a tonneau cover.

For reference throughout the Figures the term "front" indicates the vehicle cab direction.

Referring to FIGS. 9-20 generally, there is provided a rear tonneau access cover panel assembly shown generally at 100 according to an embodiment of the present invention. The assembly 100 is adapted for attachment, preferably, to mounting points in the cargo bed of the vehicle, which can be any mounting arrangement suitable for durability requirements. The assembly 100 is suitable to meet automotive specifications and functionality.

The assembly 100 has a rear attachment assembly with a pivotal portion shown generally at 111 for moving between a closed position and a first open position to partially uncover the opening into the cargo area. The assembly 100 includes at least one rear attachment portion 102, at least one latch mechanism indicated generally at 104 with a release latch 106 (or "latch handle assembly"), at least one pivotal member 108 with detent, e.g., spring loaded detent, on the pivotal portion 111, and at least one rear mounting mechanism. Any of these features are located on either side of the assembly 100, preferably, on both sides of the assembly. Most preferably, the right half of the assembly 100 and corresponding features are substantially mirror image/symmetrical to the left half of the assembly 100 and corresponding features depicted in the figures. However, the latch mechanism 104 is such that only one of either release latch 106 (or "handle" or "release lever") need be actuated by an operator for the latch mechanism 104 to be disengaged on both sides to allow pivotal movement of the pivotal portion 111, as will be explained in greater detail below.

The assembly 100 also incorporates a front attachment assembly, such as previously described front attachment assembly 14, according to an embodiment of the present invention.

The assembly 100 also includes at least one cover 138, e.g., soft cover, operably connected to at least the pivotal portion 111.

Typically, the assembly 100 has at least one mounting bracket arrangement including a rear mounting bracket 101, e.g., L-shaped bracket, that rests on and/or is operably fastened in a U-shaped mounting bracket 103 by at least one fastener. However, alternatively, depending on the application a suitable portion of the assembly 100 is bolted, screwed, welded, riveted, additionally secured with adhesive and/or epoxy, or combinations thereof or otherwise connected to the U-shaped mounting bracket 103, or other suitably shaped bracket, and/or directly to the cargo bed, e.g., side walls of the bed, depending on the application. Preferably, at least one attachment portion 102 or "attachment block" is releasably locked into the vehicle bed via the rear mounting bracket 101.

The tonneau access cover panel assembly 100 is adaptable and incorporates in combination a cable-type assembly (cover is cable tensioned), tri-fold (e.g., cover is segmented and the assembly folds up generally in the direction toward the vehicle cab), roll-up (e.g., the assembly rolls up with the rest of the tonneau, soft panels, hard panels (e.g., two or more smaller hard sections with a living hinge in-line with pivot points), soft tri-fold, hard or rigid, soft or flexible, manual or electric, hybrid, or any other type of tonneau assembly and combinations thereof, depending on the application and predetermined vehicle needs.

The assembly 100 further includes a rear bow 110 and cross member 112. The rear bow 110 is coupled to both pivotal members 108, e.g., by at least one fastener such as a nut and bolt, etc, or, alternatively, integrally formed with the pivotal members 108. The rear bow 110 is also operably coupled to the cover 138 of predetermined tonneau cover material. The rear bow 110 is in sealing engagement with the tailgate for a weather tight seal. The cross member 112 is operably connected to both attachment portions 102, e.g., slid over a mounting member that is formed on the portions 102 and secured by a plurality of fasteners 109.

The pivotal members 108, rear bow 110, and second cross member 112 are made of a metal, preferably, aluminum. However, depending on the particular application, it is also within the scope of the invention to manufacture the pivotal members 108, rear bow 110, and/or cross member 112 of different materials such as steel, composite plastic, or other suitable impact resistant material to withstand predetermined cycling requirements and load without departing from the scope of the invention.

The latch mechanism 104 includes a release latch connector bar 105 having a small rod like structure 114, preferably of metal, that is operably connected, e.g., partially inserted into the connector bar 105, to both ends of the connector bar 105 by at least one fastener 107, e.g., roll pin. Each latch handle assembly 104 includes a hook feature 116 that is biased by a detent mechanism 117, such as a spring, preferably, a torsion spring. The hook 116 locks into a respective corresponding feature 115 in the assembly, e.g., a recess with an abutting surface formed in the mounting member 101, and/or vehicle cargo bed frame. In addition to the connector bar 105, each corresponding rod 114 is also operably coupled to the respective release latch 106 handle, attachment portion 102, hook 116 and spring 117. Preferably, the rod 114 is inserted into holes in these adjacent parts to keep the parts together in operational contact. Alternatively, no rod 114 is used and the connector bar 105 is operably connected to these features. In a most preferred embodiment, when the attachment portion 102 is to be coupled to the mounting bracket 101, a forward surface 148 of the attachment portion 102 enters laterally into an opening 150 formed toward the top of the mounting bracket 101 and is held in the opening 150 by an upper surface 152 when the hook 116 is locked to the mounting member 101. When the hook 116 is selectively released, the attachment portion 102 is removable from the opening 150.

Lifting or otherwise manipulating one release latch 106, on either end, results in the rotation of both hooks 116 via the connector bar 105 to release the hook connection and release some tension. Thus, a user only needs to operate one latch 106; because of the rod 114 (on both ends)/bar 105, both sides are released allowing for selective rotation by the user to the fully open position and any intermediate position (s). To lock the attachment portion 102 into the closed position, the hooks 116 are brought back into engagement with the abutting surface 115 on the mounting bracket 101 and the pivotal portion 111 is rotated to engagement with the tailgate 142.

Figure 13:
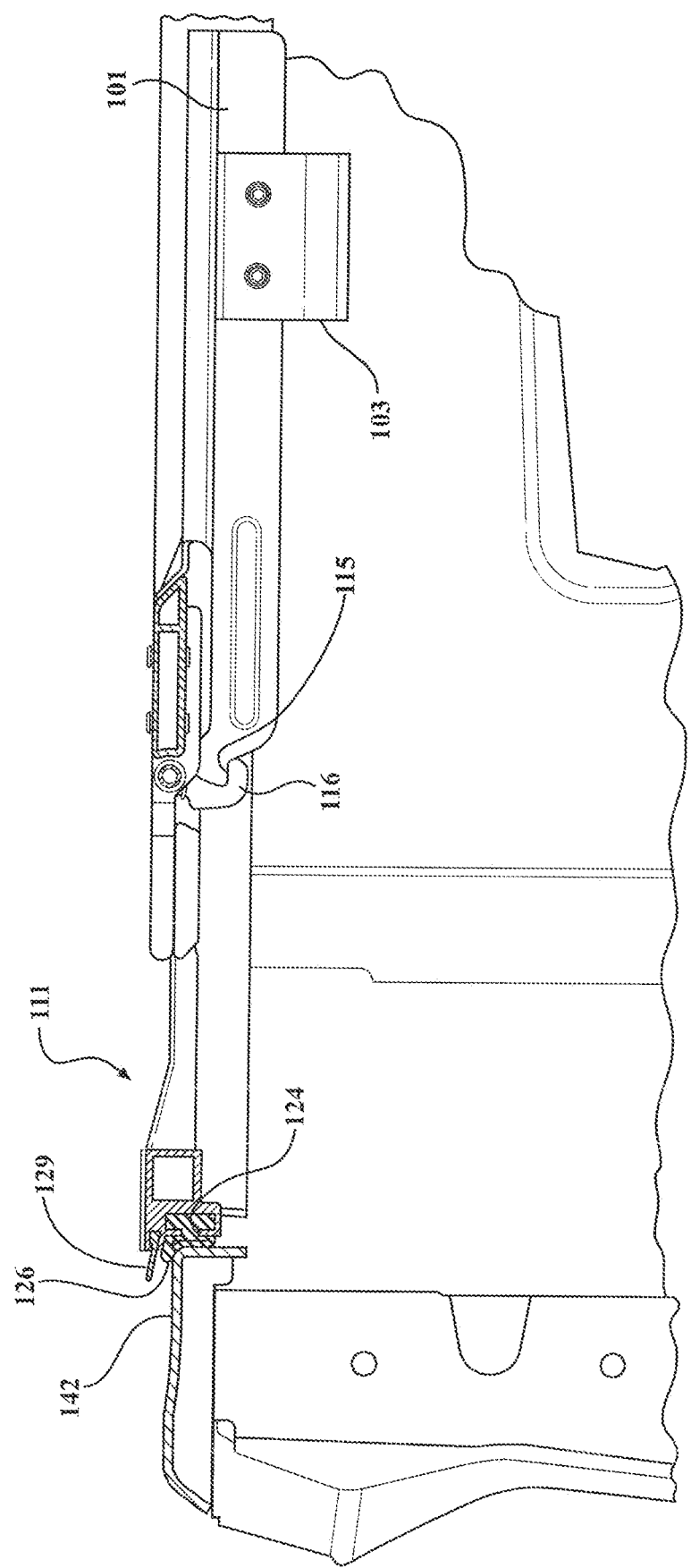
FIG. 13 is a side elevation sectional view of the tonneau cover access panel assembly in a closed position, illustrating a latch mechanism hook, according to the present invention.
Figure 14:
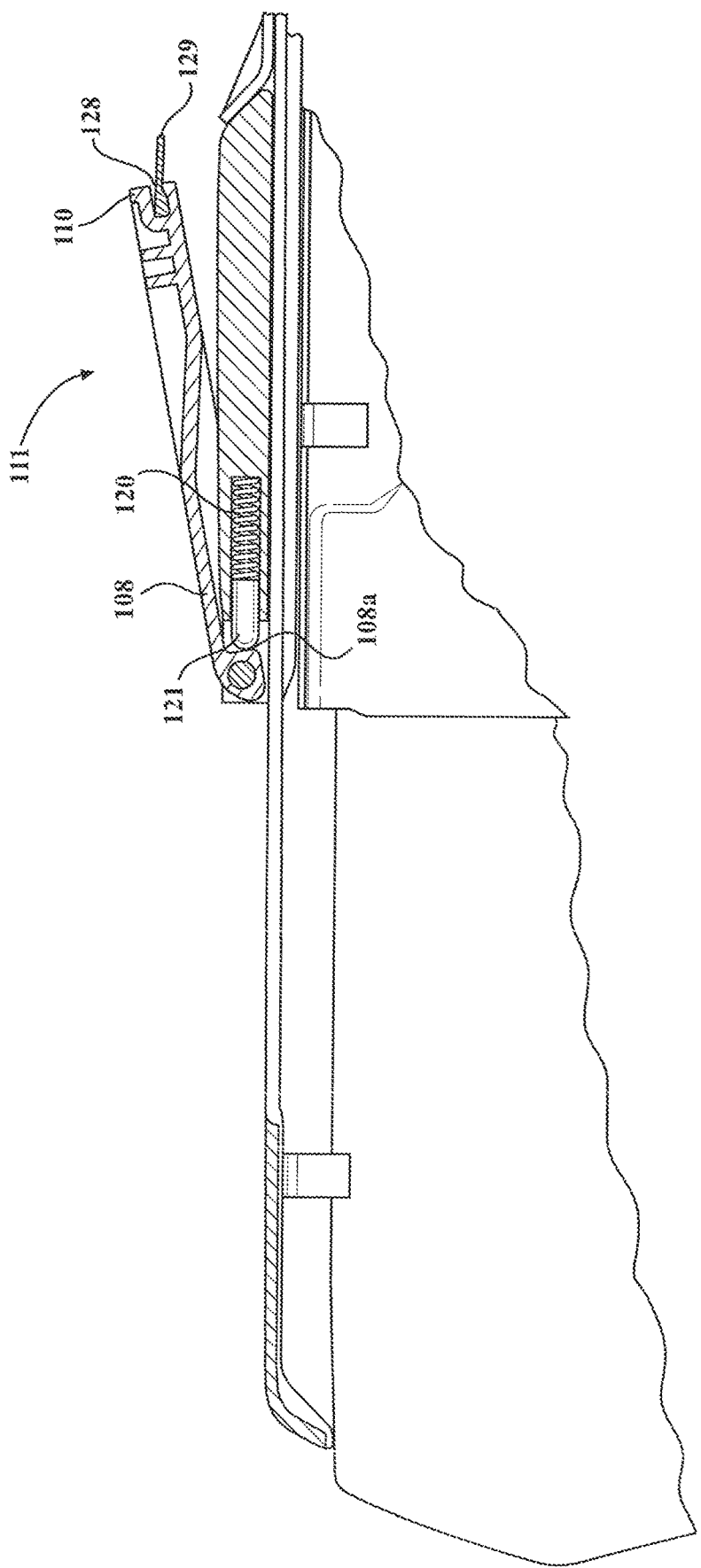
FIG. 14 is a side elevation sectional view of the tonneau cover access panel assembly in an open position, showing a spring loaded detent, according to the present invention.
Figure 15:
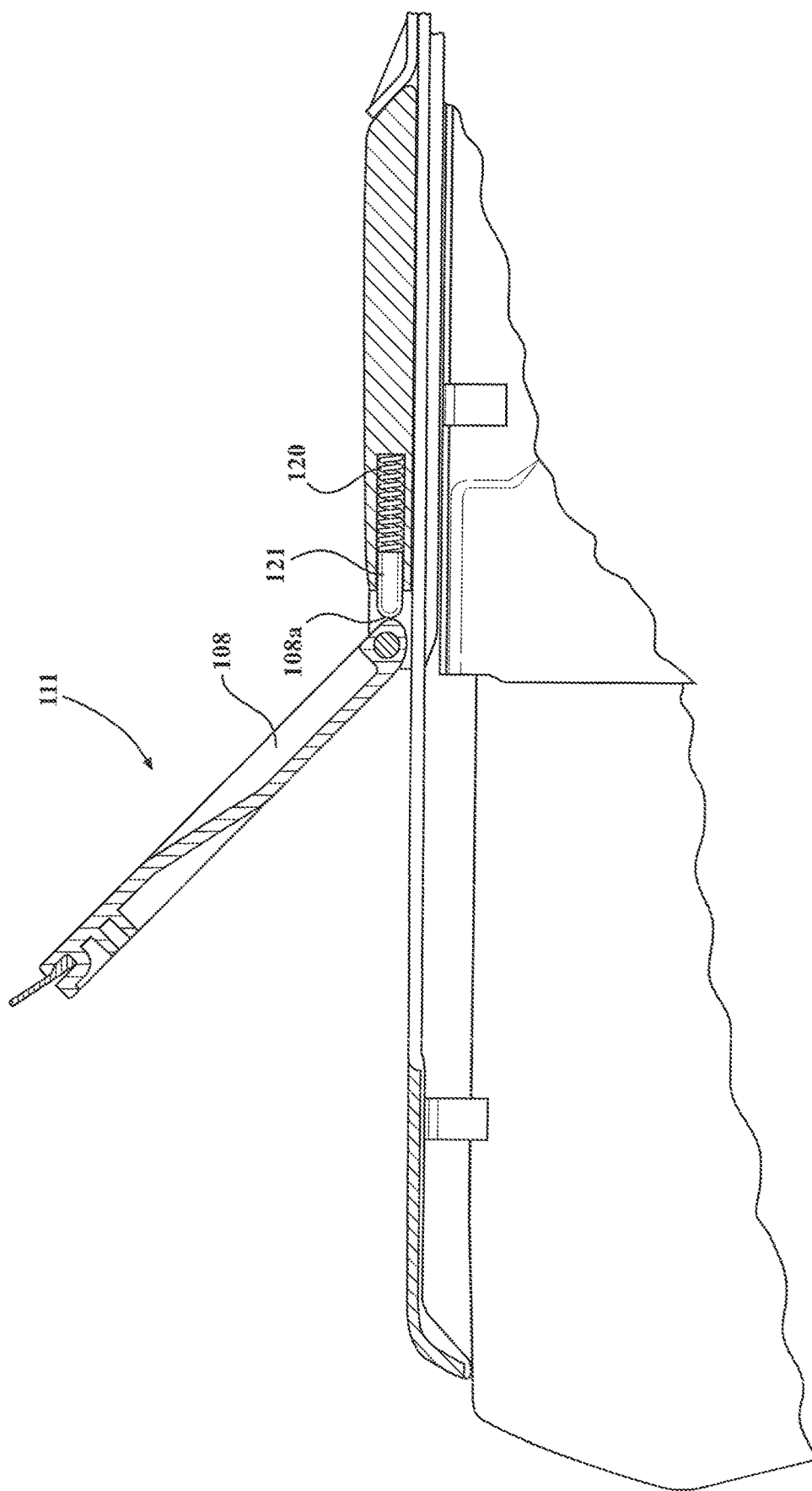
FIG. 15 is a side elevation sectional view of the tonneau cover access panel assembly in an intermediate open position, showing a spring loaded detent, according to the present invention.
Figure 16:
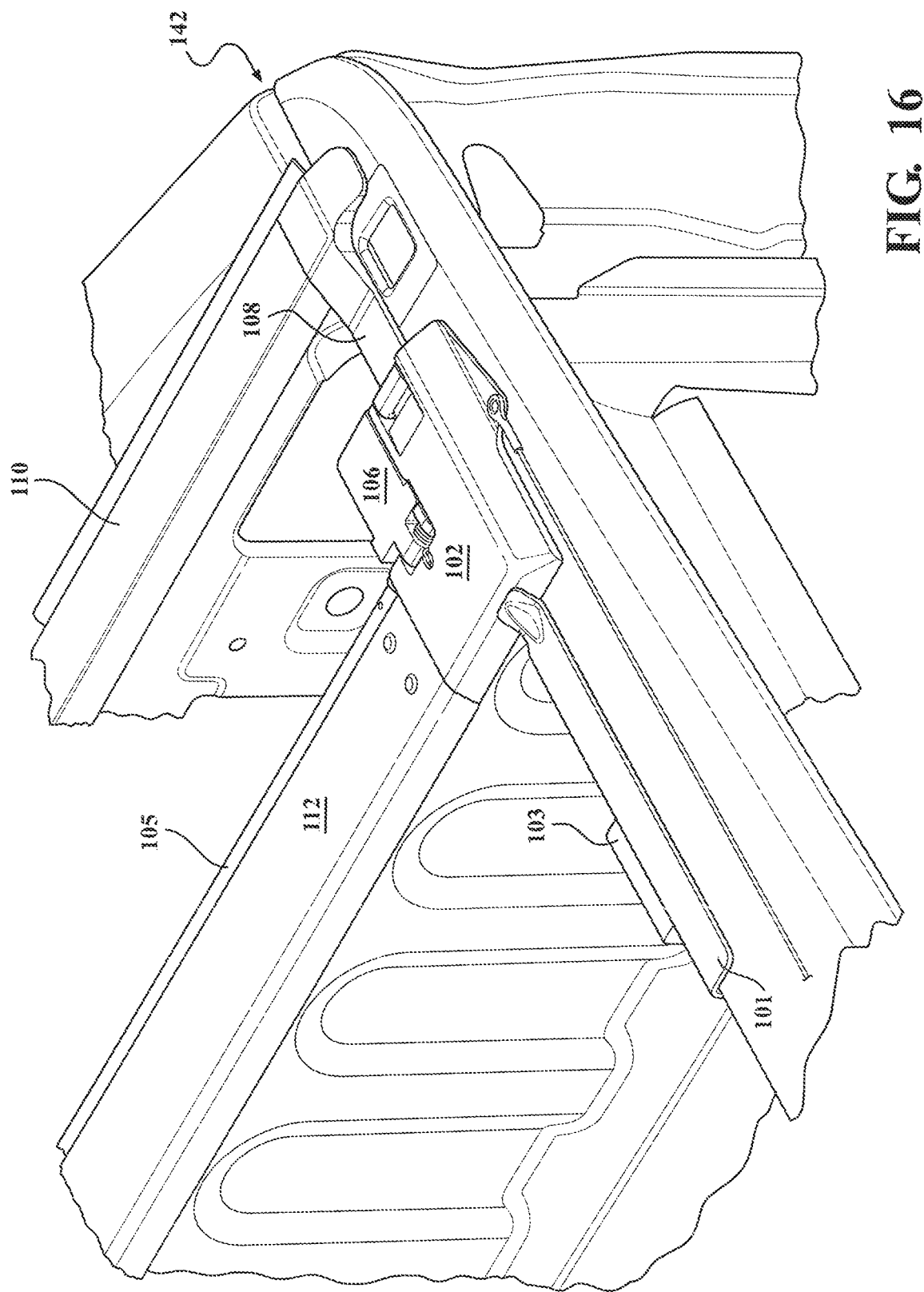
FIG. 16 is a front perspective view of the tonneau cover access panel assembly, depicted in an environment of use adjacent a tailgate, according to the present invention.
Figure 17:
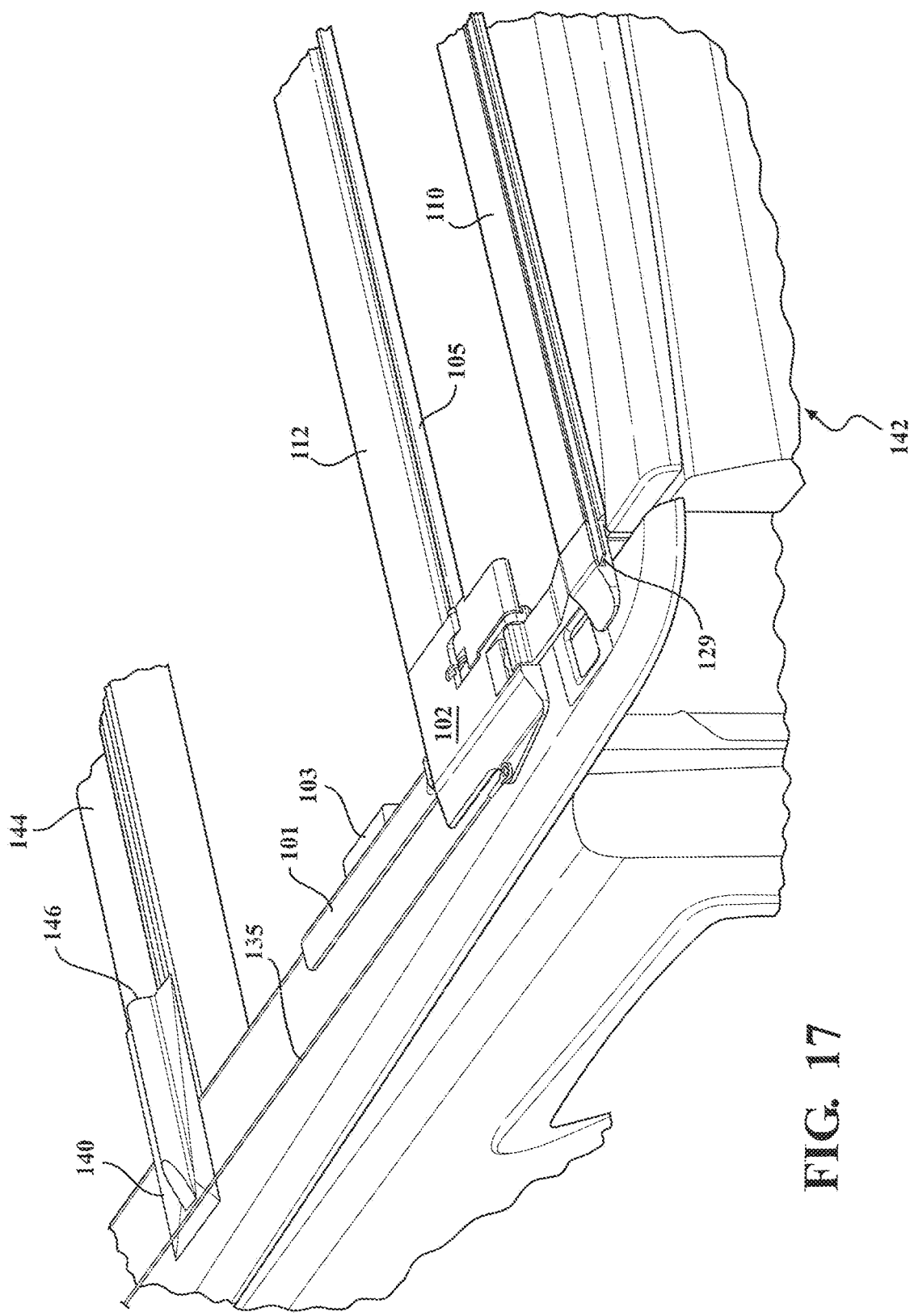
FIG. 17 is a rear perspective view of the tonneau cover access panel assembly in a closed position, and shows a bow pocket, according to the present invention.
Figure 18:
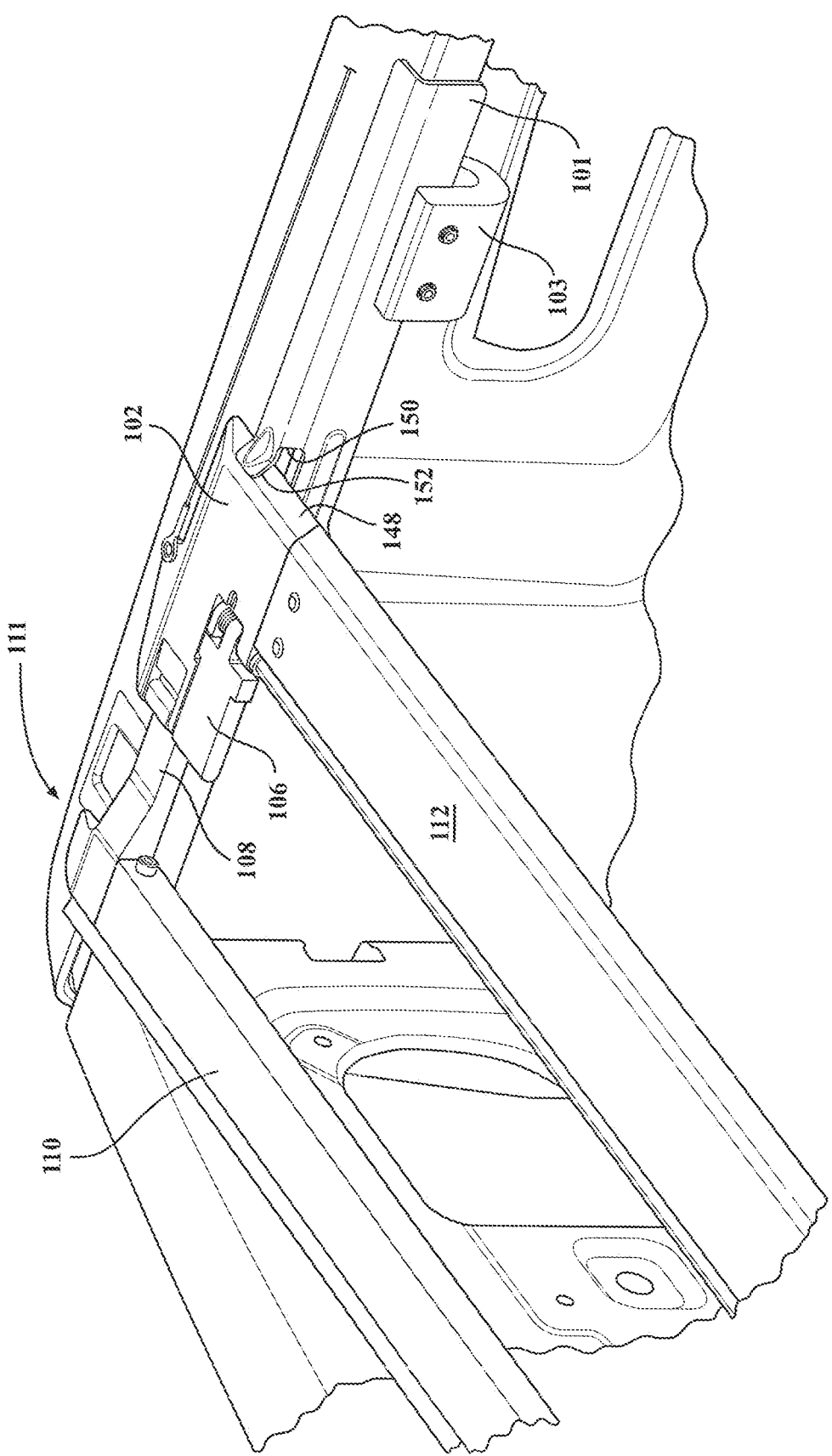
FIG. 18 is a rear isometric view of the tonneau cover access panel assembly in a closed position, according to the present invention.

The pivotal portion's 111 pivot members 108 are pivotally connected to the attachment portion 102 by a second pin 118 or metal rod and has a spring loaded detent. The combination of a spring 120 backing an anterior block 121 against a posterior surface 108a of the pivotal members 122 locks the pivotal member 108 in up/down positions (open/closed). This also serves to prevent the pivotal members 108/rear bow 110 from bouncing in the open and/or closed positions during vehicle transit. Preferably, the spring 120 is a compression spring. FIG. 13 illustrates a closed position, while FIG. 14 illustrates a first open position. Providing intermediate position(s) is/are contemplated, e.g., such as that shown in FIG. 15 because of the detent surface(s)/spring 120, without departing from the scope of the present invention. FIG. 15 is at about 45 degrees, however, greater or lesser degrees are contemplated.

The rear bow 110 is operably adapted to be in sealing engagement with the tailgate shown generally at 142 (FIG. 13).

According to an embodiment of the present invention, the rear bow 110 includes an operably shaped channel 124 to slidably receive and retain a seal 126. Most preferably, the seal 126 is a bulb seal having at least one bulb. Although an exemplary channel 124 is shown, it is understood that the channel 124 can have any shape suitable for receiving an opposing connecting feature of the seal 126. The seal 126 is slid into the channel 124 and operably held in place by friction and/or at least one fastener and/or at least one other suitable feature to prevent the seal 126 from leaving the channel 124. Preferably, the channel 124 is generally located on the underside of the rear bow 110. Most preferably, channel 124/bulb attaches toward the leading edge of the rear bow 110. The bulb seal 126 goes against a predetermined portion of the tailgate for a weather resistant seal. The spring loaded detent 120/121/108 pushes the pivotal members 108/rear bow 110 in the direction toward the tailgate and therefore pushes the seal 126 against the tailgate.

Generally, the seal 126 is an extruded material of polypropylene, thermoplastic elastomer, soft TPE (Thermoplastic Elastomer), rigid PVC, flexible PVC, PVC vinyl, PVC rubber, ABS, a structural ABS (Acrylonitrile Butadiene Styrene), polypropylene, or other plastic material or other suitable material and combinations thereof suitable for providing a structural portion to remain in the channel 124 and additionally a resilient seal portion, e.g., bulb.

The rear bow 110 also includes an operably shaped second channel 128 to receive a mounting portion of the tonneau cover. Preferably, the mounting portion is an extrusion 129 is sewn to the cover and slid into the second channel 128. The extrusion/cover 128 is held in place by friction and/or at least one fastener and/or at least one other suitable feature to prevent the cover from leaving the second channel 128. Most preferably, no fasteners are used to connect the cover to the channel which is a significant benefit. In one embodiment the channel 128 is generally located on the underside of the rear bow 110 toward a leading edge when in the closed position. This allows the cover to wrap up and around the bow edge and back so that the frame of the assembly 100 is not visible. Preferably, the channel 128 is located on the leading edge of the rear bow 110 when in the closed position. The mounting portion is a predetermined shape received in the channel 128 in the rear bow 110. Other suitable arrangements, P-welts, C-shaped channels, can be used to couple the cover 138 to a bow (such as in known manners described in U.S. Pat. No. 6,322,129 B2 incorporated herein by reference).

According to an embodiment of the present invention, in operation, the user flips the pivotal portion 111 rearward to a first open position to gain partial access to the cargo bed structure. When a larger opening into the structure is desired, the user rotates the release latch 106 in a first direction which disengages the hook 116 from the mounting bracket 101 allowing the pivotal portion 111 with the cover 138 attached to be rolled, or otherwise suitably articulated, as far back toward the front attachment assembly 14 as desired. Rolling the unit all the way to adjacent the front attachment assembly 14 provides a fully uncovered opening into the cargo bed.

In a preferred embodiment, only the mounting bracket arrangement with the rear mounting bracket 101 and mounting bracket 103 stays in the affixed position after unlatching the hooks 116 allowing selective rotation of the rest of the assembly to a fully open position, e.g., positioned adjacent the cab for greatest access into the cargo bed. In a preferred embodiment, once the hooks 116 are unlatched, the cover with the attached pivotal portion 111 is able to be rolled up and stowed toward the front attachment assembly 14. Straps can be used to keep the rolled assembly 100 in the fully open position and/or any intermediate open position(s).

According to the present invention, there are predetermined desired positions of the assembly 100 with predetermined amounts of access into the cargo bed of the vehicle indicated generally at 130. The assembly 100, preferably the rear bow 110, is in sealing engagement against the tailgate 142 in a closed position. When in the first open position, the pivotal portion 111 has been pivoted back to create an opening of predetermined width, e.g., not more than 6 inch opening. In one or more predetermined deployed position(s) the assembly 100 is provided in combination with a tri-fold cover or any other type of tonneau cover assembly, and when deployed, an opening of predetermined width, e.g., quarter, half, and/or full top access into the cargo bed. These examples are exemplary and not limiting.

Generally, when the assembly 100 is in the first open position the width of the opening into the bed is at least 3 inches, typically 3-10 inches, preferably 4-8 inches, most preferably about 6 inches.

In one embodiment, another safety advantage option of the present invention is that the assembly 100 cannot be operated unless the tailgate is unlatched and/or unlocked.

In one preferred embodiment, a cable attachment feature 134 is provided on the attachment portion 102 for attaching cable(s) 135 for a cable tonneau cover assembly. Preferably, the cable 135 is not a hard attachment to the vehicle to help manage the cable/cover/sealing. The cable 135 eliminates Velcro hook and loop for sealing, which is a significant benefit over conventional systems. Rather, the cable 135 holds the cover 138 taut as desired along at least the outboard sides of the cover 138. The cable 135 is also attached to at least the front attachment assembly 14, e.g., to the attachment block 24. Other attachment point(s) are contemplated depending on the application without departure from the scope of the present invention. Other cable-type arrangements are contemplated depending on the application without departure from the scope of the present invention. According to an embodiment of the present invention, at least one weather resistant seal is provided on the cover, e.g., sewn and/or adhered, near the sides and/or rear of the cover 138.

Figure 19:
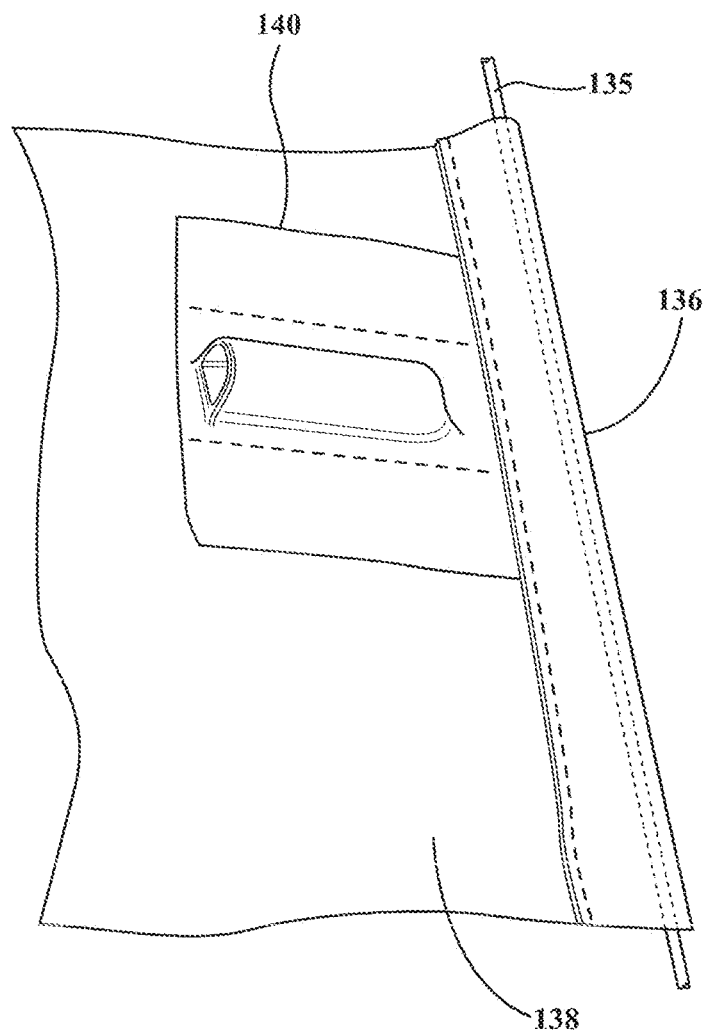
FIG. 19 is bottom perspective view of a bow pocket connected to a section taken of the cover, according to the present invention.
Figure 20:
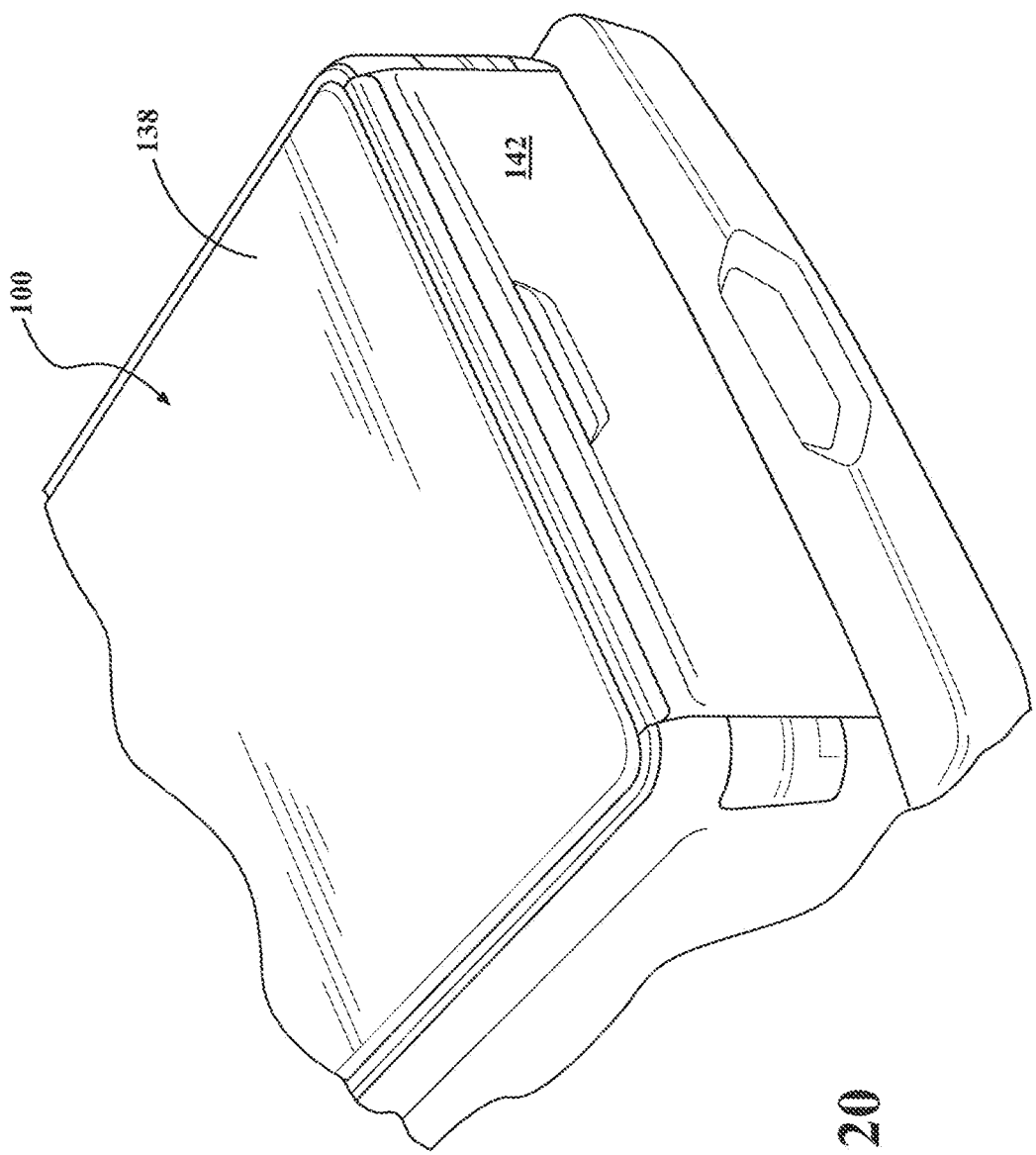
FIG. 20 is a perspective view of an exemplary tonneau cover access panel assembly depicted in an environment of use on a vehicle, according to an embodiment of the present invention.
Figure 21:
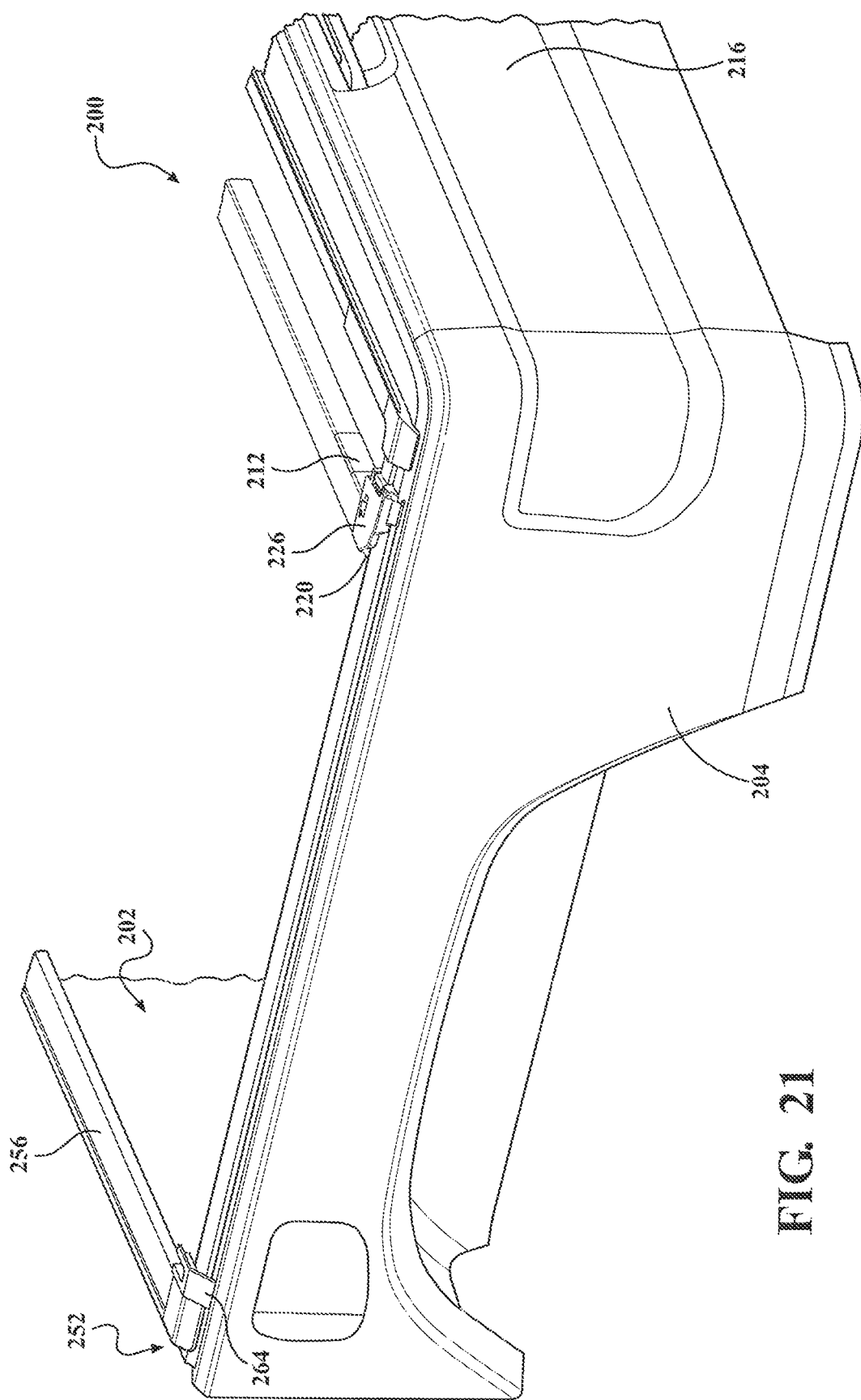
FIG. 21 is a perspective view of a tonneau cover assembly with the cover material omitted for clarity, depicted in an environment of use on a vehicle, according to another embodiment of the present invention.
Figure 22:
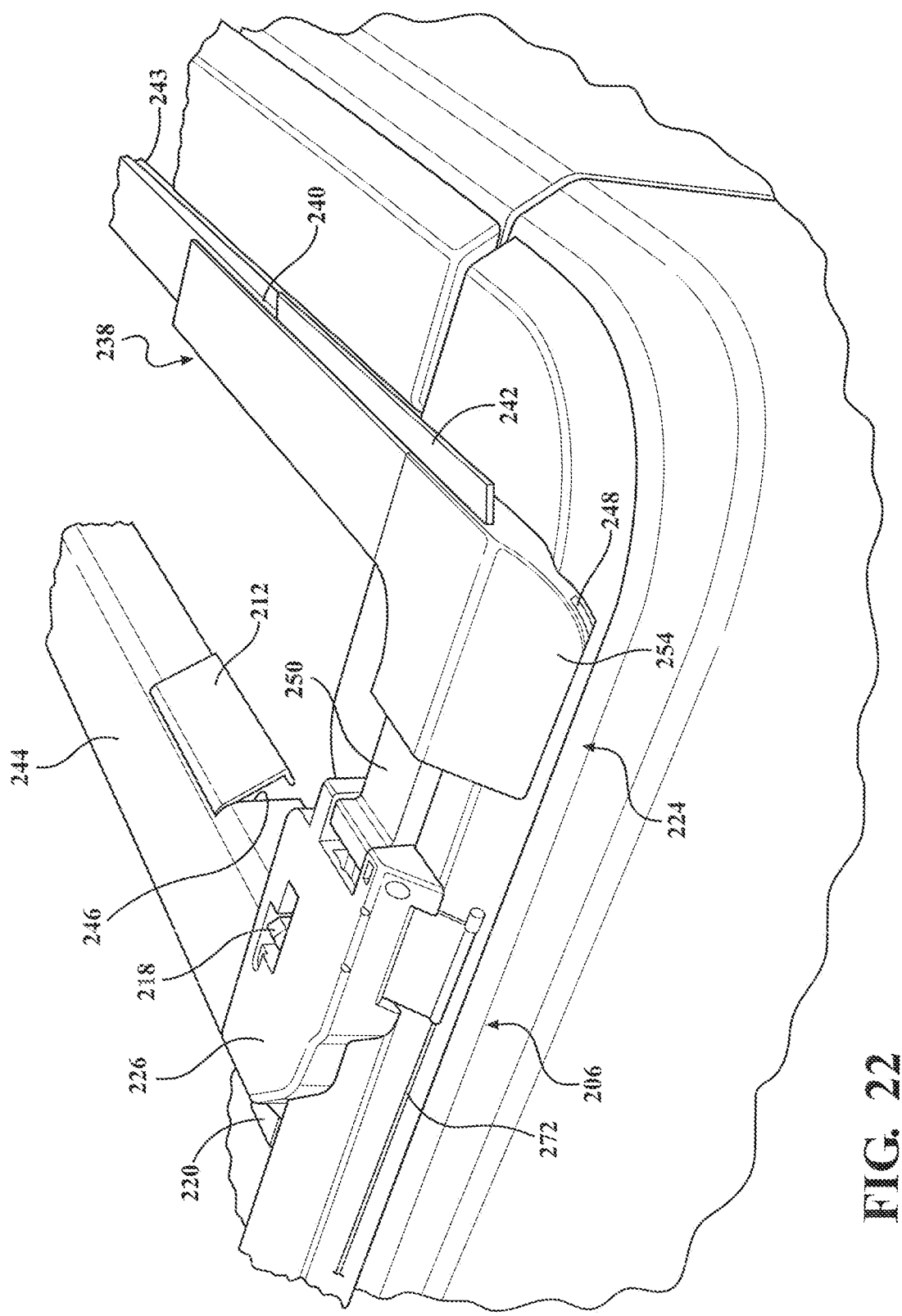
FIG. 22 is an enlarged perspective view of a rearward portion of the assembly of FIG. 21, according to the present invention.
Figure 23:
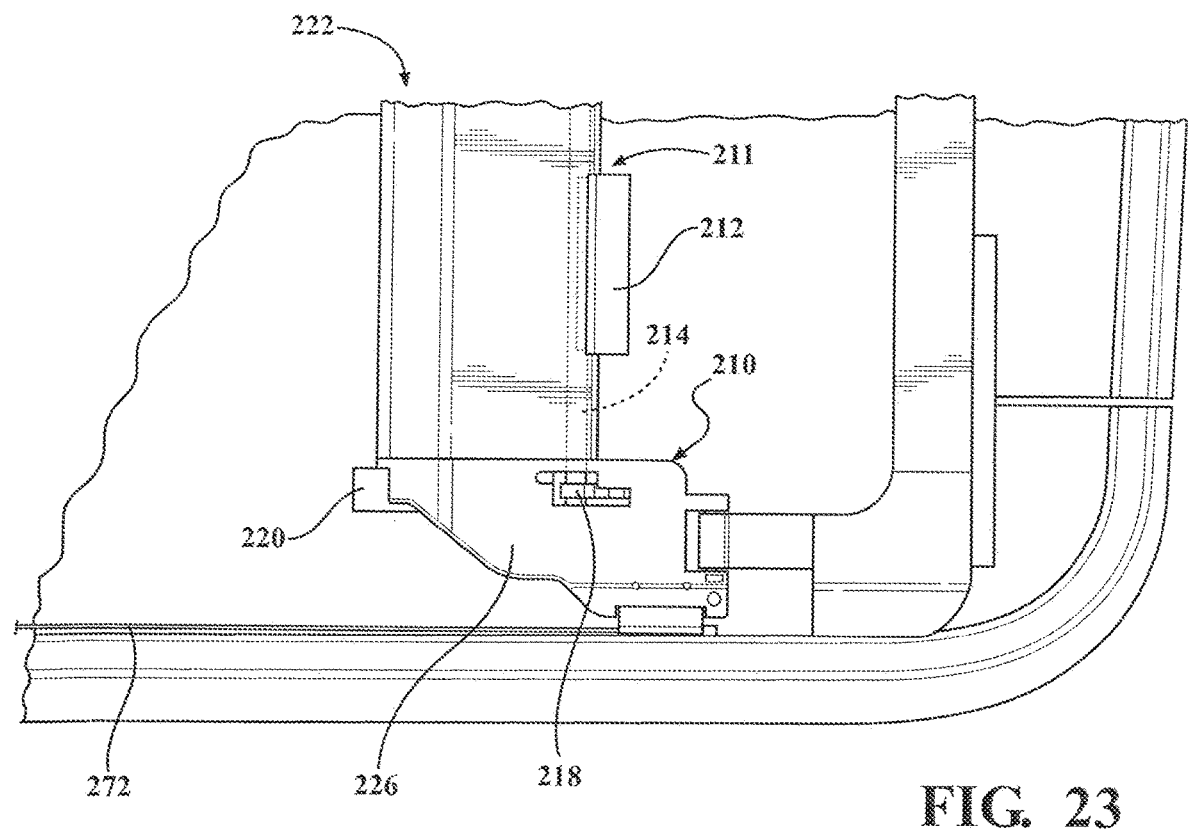
FIG. 23 is a top plan view of the assembly of FIG. 22, according to the present invention.

Referring more particularly to FIG. 19, the cable is located within a cable pocket 136, where the cable pocket 136 is sewn and/or adhered along the outer edge of the cover 138.

Preferably, a plurality of pockets 140 are provided to hold both ends of center management bow(s) 144. There are provided at least one, preferably at least two, most preferably at least three, center management bows 144. The bows 144 set the height and eliminate aluminum rails and attachment features, which such rails are conventionally required. The center management bows 144 also assist with cover management. The pockets 140 have a predetermined suitable height and width depending on the application. The pockets 140 also set the distance between each center management bow 144. The center management bows 144 run cross-car. The cable pocket 136 preferably runs past outwardly from the pockets 140 for center management bows 144.

When the top cover is fabric or other flexible material these pockets 140, most preferably, of molded acrylonitrile butadiene styrene (ABS), having predetermined suitable thickness, are sewn and/or adhered to at least the cover. The pockets 140 are on the underside surface of the cover 138, thus not visible when the cover 138 is in the closed position. Each end of the center management bows 144 are slid into an opening 146 in a respective pocket 136. Preferably, the pockets 140 rest on existing original manufacturer bed features/rails and sets the height and cross-car relative to the bed. The pockets 140 sets the height and are thin enough to sew to the cover material. The pockets 140 set the distance between the bows 144 and, in combination with the bows 144, help with moving the assembly to a fully open position and any intermediate open position(s), e.g., to help with rolling the cover/assembly. The pockets 140 also eliminate the addition of aluminum rails for the cover and eliminate the tongue and loop for cover sealing, which are significant advantages.

While a cable-type tonneau cover assembly is depicted in the figures, the assembly 100 can be used in combination with any type of tonneau cover assembly without departing from the scope of the present invention.

Referring now to FIGS. 21-33, there is depicted a tonneau cover access panel assembly (or "assembly") shown generally at 200. The assembly 200 is adapted for attachment to a plurality of pre-drilled mounting points provided on the cargo bed, shown generally at 202 of the vehicle 204, which can be any mounting arrangement suitable for durability requirements. Alternatively, installation includes first drilling mounting points in the cargo bed. The assembly 200 is suitable to meet predetermined automotive specifications and functionality and/or any predetermined after-market requirements. The assembly 200 has at least one tensioning system, shown generally at 206, e.g., a cable-type system, and at least one cover 208 that is generally rollable for storage. However, it is understood that alternative tensioning systems and/or alternative covers/storage methods are contemplated depending on the particular applications without departure from the scope of the present invention. The assembly 200 also has a latching mechanism, indicated generally at 210, that includes at least one release lever, shown generally at 211, including at least one handle 212 connected to a connecting bar 214 such that the handle 212 can be pulled generally forward (in the direction toward the vehicle tailgate 216) to release a latch 218 from a mounting bracket 220 connected to the vehicle bed 202. The location and pull direction of the handle 212 is more convenient and easier to handle for an operator because there is less interference with the cover 208 than if having to turn the handle in a more upward direction, for example, where there would be limited space due to the cover 208 being more in the way above.

The assembly 200 has a rear attachment assembly shown generally at 222 that engages the tailgate 216 to close off a top opening into the vehicle bed 202. A pivotal portion shown generally at 224 of the rear attachment assembly 222 rotates between a closed position (FIG. 30) and a first open position (FIG. 31) or "flipped back" to partially uncover the top opening into the cargo bed 202. In an embodiment of the present invention, the pivotal portion 224 has detent, e.g., spring loaded detent, (e.g., generally as described previously). At least one rear attachment portion 226 of the rear attachment assembly 222 is selectively connected to the mounting bracket 220. When the rear attachment portion 226 is not connected to the mounting bracket 220, the rear attachment assembly 222 can be rolled with the cover 208 toward the cab (FIG. 32) and secured in the fully open position (FIG. 33), which uncovers the top opening into the cargo bed 202. However, when the rear attachment portion 226 is connected to the bracket 220, the rear attachment assembly 222 and cover 208 cannot be rolled; rather, only the pivotal portion 224 can be moved (between the closed and flipped back positions).

Figure 24:
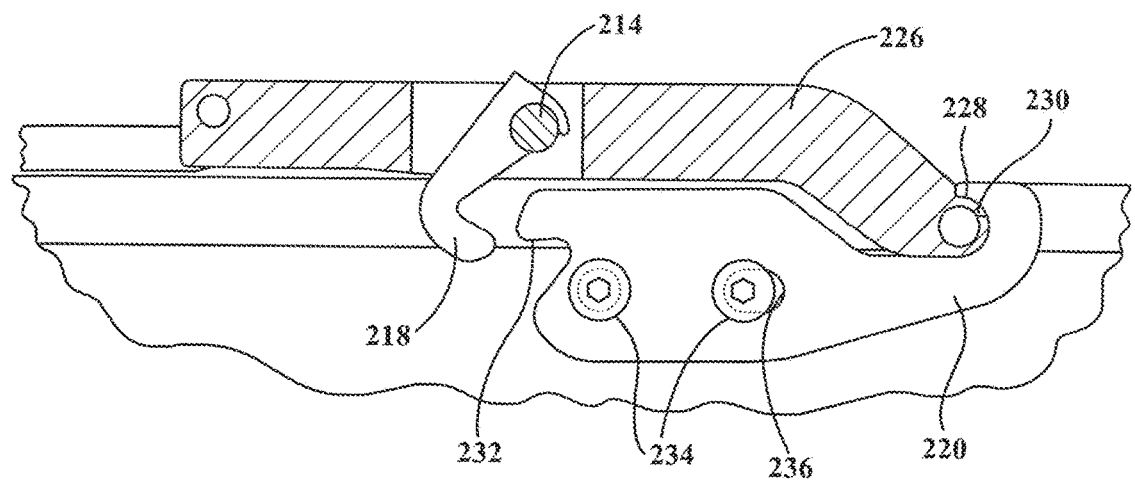
FIG. 24 is a side elevation sectional view of a mounting bracket connected to the vehicle and illustrating a latching mechanism of the tonneau cover access panel assembly in an unlatched position, according to the present invention.
Figure 25:
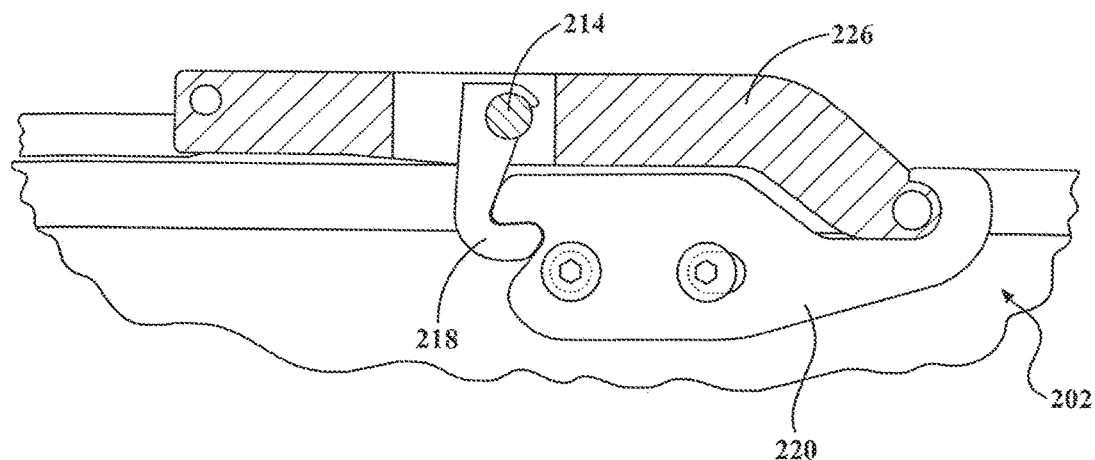
FIG. 25 is a side elevation sectional view illustrating the latching mechanism of FIG. 24 in a latched position, according to the present invention.
Figure 26:
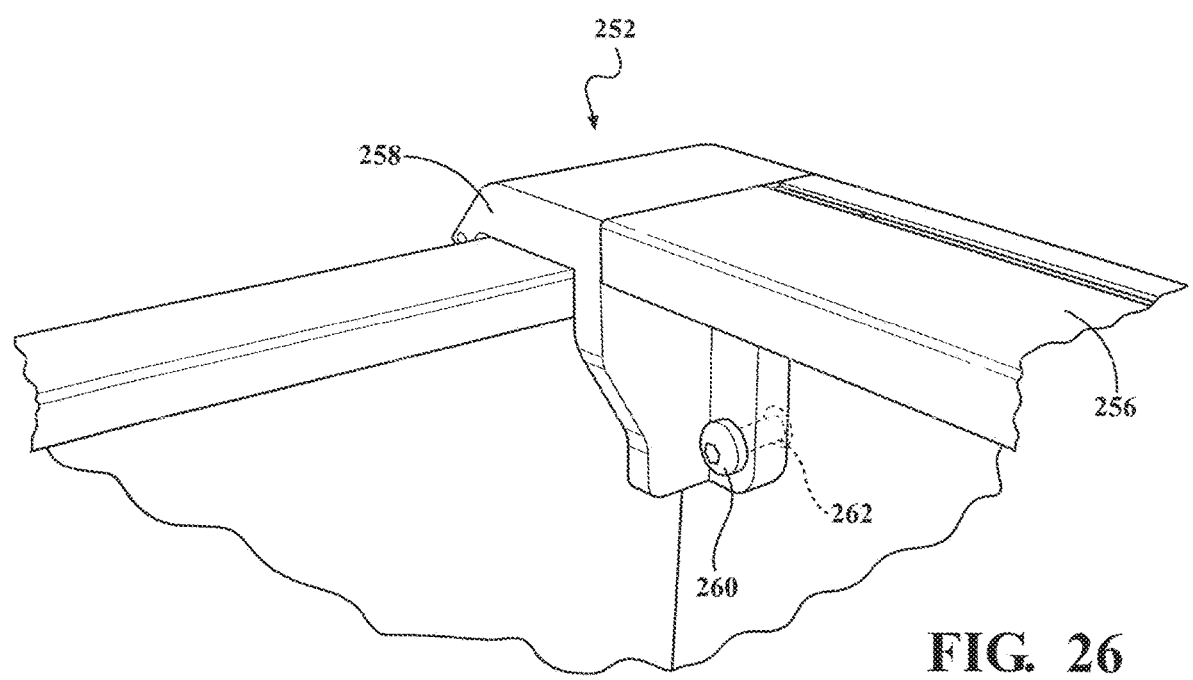
FIG. 26 is an enlarged right hand perspective view of a forward portion of the assembly depicted in FIG. 21, according to the present invention.
Figure 31:
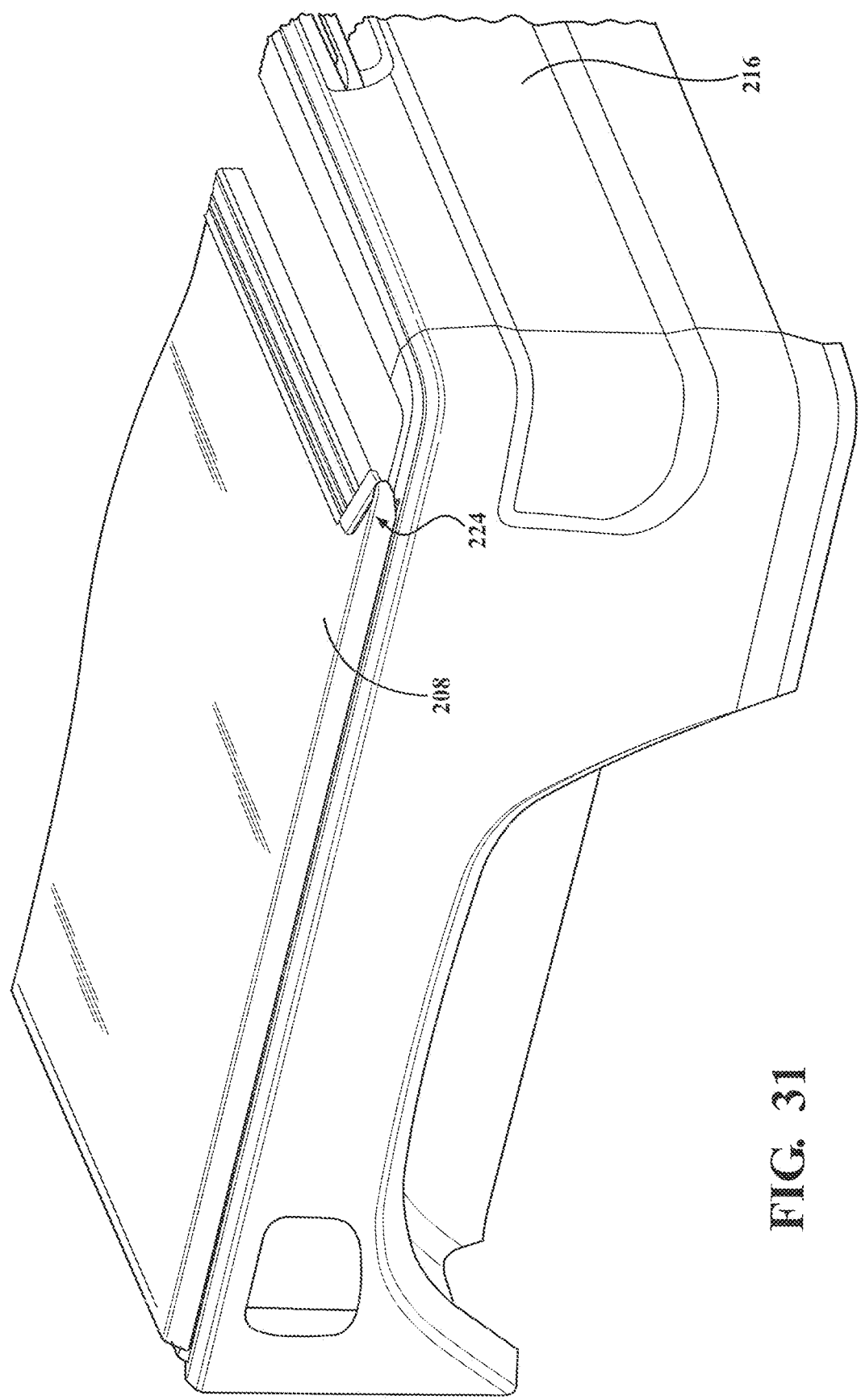
FIG. 31 is a perspective view of the tonneau cover access panel assembly in a first open position for partial access into the vehicle bed, according to the present invention.
Figure 32:
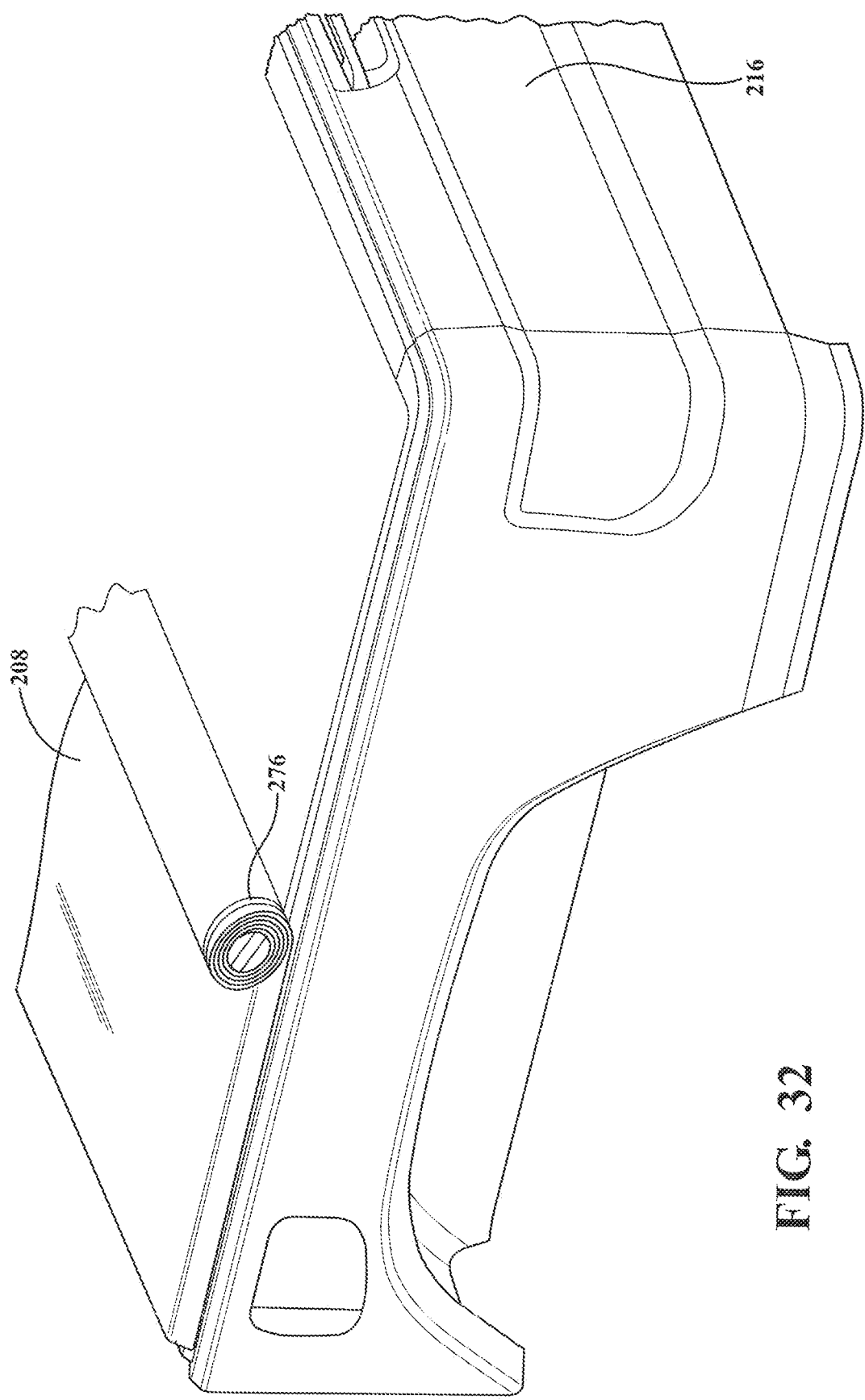
FIG. 32 is a perspective view of the tonneau cover access panel assembly of FIGS. 30-31 further opened, according to the present invention.
Figure 33:
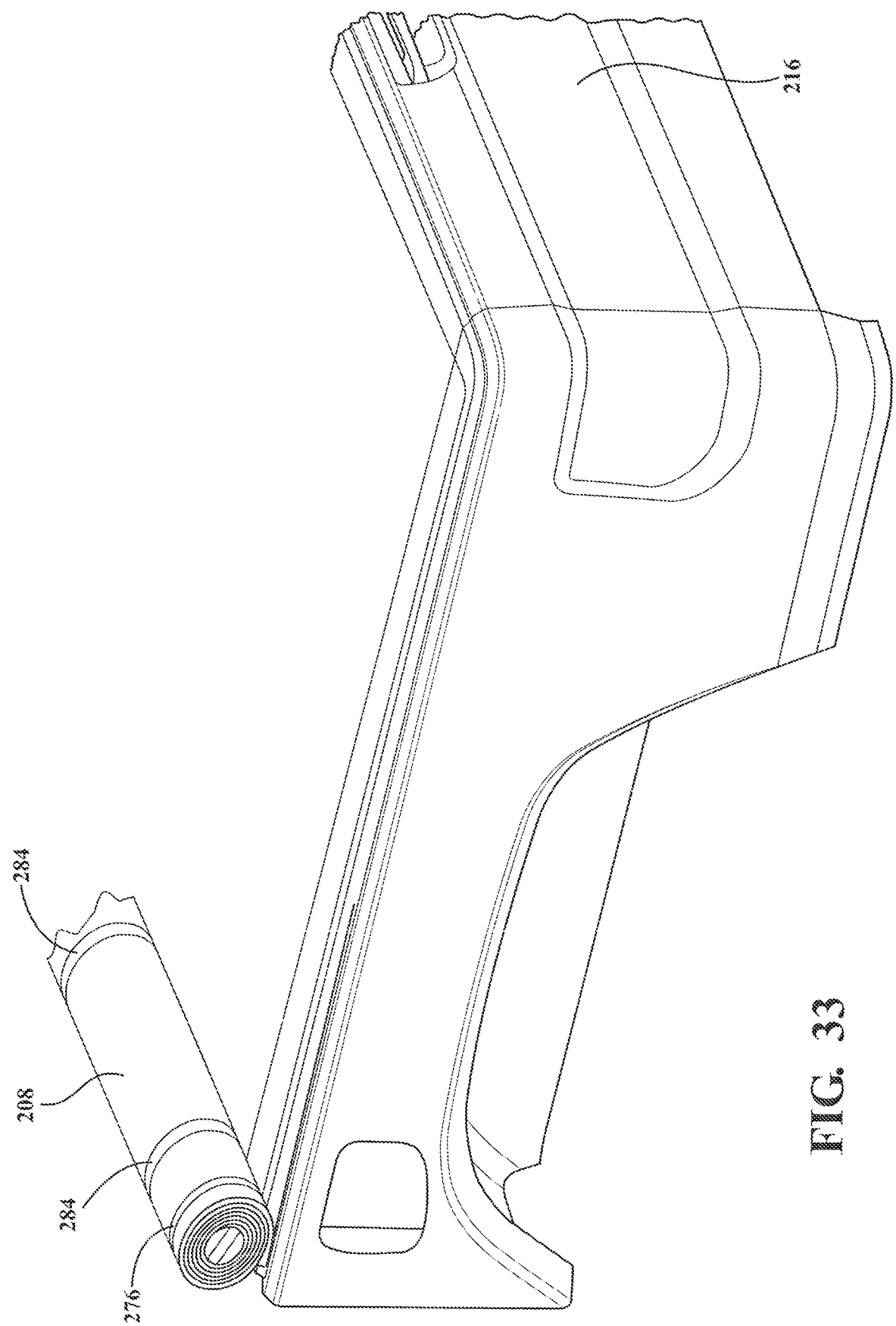
FIG. 33 is a perspective view of the tonneau cover access panel assembly in a fully open, stored position for full access into the vehicle bed, according to the present invention.

To selectively connect the rear attachment portion 226 to the mounting bracket 220 the operator aligns one end 228 of the attachment portion 226 within a first recess 230 formed in the mounting bracket 220 (FIG. 24). FIG. 24 illustrates the latch 218 in an unlatched position. The latch mechanism 210 is then moved to engage the latch 218 with the mounting bracket 220 (FIG. 25). In particular, a bottom surface of the attachment portion 226 is brought down to adjacent a top surface of the mounting bracket 220 and the latch 218, e.g., which is generally hook-shaped, is rotated to engage a second recess 232 with a top lip formed in the mounting bracket 220. FIG. 25 illustrates the latch 218 in a latched position, thereby connecting the rear attachment portion 226 to the mounting bracket 220. When desired, the operator pulls the handle 212 to unlatch the latch 218 again. The handle 212 rotates the connector rod 214 connected thereto, which connector rod 214 is also connected to the latch 218 and rear attachment portion 226. Thus, pulling the handle 212, e.g., in the direction generally toward the tailgate, causes the connector rod 214 and latch 218 to rotate in a first direction to unlatch the latch 218 from the mounting portion 220. In one embodiment, pushing the handle 212, e.g., in a direction generally away from the tailgate, causes the connector rod 214 and latch 218 to rotate in a second direction to latch the latch 218 to the mounting portion 220. Alternatively, the latch 218 is operably biased toward the second direction, and pulling the handle 212 overcomes the bias force to rotate the latch 218 to the unlatched position.

Preferably, two handles 212 are connected to the connector bar 214, and, since pulling either handle 212 causes the bar 214 to rotate, pulling just one handle 212 causes both latches 218 to unlatch from the respective mounting brackets 220.

At least one fastener 234 connects the mounting bracket 220 to at least one mounting point 236, e.g., aperture, located toward the upper inner side of the vehicle bed 202.

The pivotal portion 224 is rotatably connected to the rear attachment portion 226 by two pivotal members 250. The pivotal portion 224 also has a rear bow shown generally at 238 with at least one channel 240 for holding at least one retainer 242 connected to the cover 208, e.g., sewn, to secure the cover 208 to the pivotal portion 224. Preferably, at least one second channel 248 is formed on the sides of rear corner segments 254 of the pivotal portion 224 to receive a respective retainer connected to the cover 208 for more secure, taut connection of the cover 208 to the assembly 200. A seal 243 is connected to another channel formed in the rear bow 238 for sealing with the tailgate 216 when in the closed position. Preferably, the rear bow 238 is an aluminum extrusion.

The rear attachment portion 226 is also connected to a cross member 244. The connector bar 214 runs within or directly under the cross member 244. Most preferably, the cross member 244 is a generally U-shaped member to help protect the latching mechanism features, while at the same time reducing the amount of material needed. At least one cutout 246 is located on the cross member 244 for placement of the respective handle 212. Preferably, the cross member 244 is an aluminum extrusion.

The assembly 200 also includes a front attachment assembly shown generally at 252 including a front bow 256 connected to front rail corner attachment portions 258. The front attachment portions 258 rest on the top edge of the side of the vehicle bed and are also connected to the bulkhead of the cargo bed 202. At least one fastener 260 connects each front attachment portion 258 to a respective mounting point 262, e.g., aperture, located toward the upper front end of the vehicle bed 202. Preferably, the fastener 260 is a spin washer with a screw. In an alternative embodiment, the front attachment assembly 252 is adapted to be a no drill attachment, as described previously.

Preferably, the front bow 256 is an aluminum extrusion.

The front bow 256 is connected to the front edge of the cover 208. A seal is also preferably provided for sealing engagement with the bulkhead.

The front bow 256 is shaped, e.g., curved or bowed, when desired to correspond with the shape of the bulkhead depending on the particular application.

A plurality of pockets 264 are provided to hold both ends of a plurality cover management bows 266, respectively. The bows 266 are connected within each pocket 264. Most preferably, at least one fastener 268, e.g., screw, connects the pocket 264 to the bow 266. The pockets 264 are also connected to the cover 208, e.g., sewn and/or adhered in at least one location of the pocket to the cover (exemplary sew lines 270 to depict locations for the sewing of the pockets 264 to the cover 208 are shown in FIG. 28A). The bows 266 are thereby connected to the cover 208 by way of the pockets 264. However, additional attachments to the cover 208 for each bow 266 are contemplated without departure from the scope of the present invention. The pockets 264 rest on the top side edges of the cargo bed 202 (best shown in FIG. 21).

Preferably, there are at least three bows 264. Typically, the pockets are acrylonitrile butadiene styrene (ABS). Preferably, the pockets 264 are vacuum formed polycarbonate.

The cable system 206 of the assembly 200 includes at least one cable 272. The cable 272 is connected to the rear attachment portion 226 and the front attachment portion 258 and runs within a cover pocket 274 along the side of the cover 208, which is preferably a sewn and/or adhered pocket 274 formed in the cover 208. The pocket 274 is located generally outboard from a seal 276 connected to the underside of the cover for sealing engagement with the top edge of the cargo bed 202 side walls.

Thus, the cable system runs fore and aft. However, the tensioning system additionally runs inboard as well. The cable, preferably, at least one other cable 278 is connected to the front attachment portion 258 and extends along the inside of the front bow 256 across the bulkhead. In a most preferred embodiment, the cable 278 is connected to a spring 280, which spring 280 is connected to at least one fastener 282 or bracket located about half way across the bulkhead. On the other side of the fastener 282, or via an additional fastener connected to the bulkhead, another spring is provided that is connected to another cable, which cable is connected to the other front attachment portion. FIG. 27 illustrates the left hand cable 278 and spring 278 connected to the fastener 282, which is connected to the bulkhead toward the front of the cargo bed 202. It is understood that the right side would be substantially a mirror-image to the left side. Thus, the cable system runs fore and aft, and additionally has cable tensioning along the front of the assembly 200. The springs 278 improve cable tensioning.

Alternatively, the cable 272 is connected to the rear attachment portion 226 at one end, is channeled through the front attachment portion 258, and is connected at the other end to the spring 280.

Generally, the seals of the assembly 200 are an extruded material of polypropylene, thermoplastic elastomer, soft TPE (Thermoplastic Elastomer), rigid PVC, flexible PVC, PVC vinyl, PVC rubber, ABS, a structural ABS (Acrylonitrile Butadiene Styrene), polypropylene, or other plastic material or other suitable material and combinations thereof.

Generally, when the pivotal portion 224 is in the first open position, the width of the opening into the bed is at least 3 inches, typically 3-10 inches, preferably 4-8 inches, most preferably about 6 inches. When the assembly 200 is in the open position, straps 284 can be used to keep the cover 208 rolled.

Most preferably, the right half of the assembly 200 and corresponding features are substantially mirror image/symmetrical to the left half of the assembly 200 and corresponding features depicted in the figures.

In one embodiment, another safety advantage option of the present invention is that the assembly cannot be operated unless the tailgate is unlatched and/or unlocked.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. A tonneau cover assembly adapted for a vehicle, comprising:
    at least one rear attachment assembly adapted for operably coupling to the vehicle adjacent a top cargo bed opening of the vehicle, said at least one rear attachment assembly including a pivotal portion operably coupled to a cover, wherein pivoting the pivotal portion in a first direction moves the cover to a first position to close off the top cargo bed opening of the vehicle and pivoting the pivotal portion in a second direction to a second position partially uncovers the top cargo bed opening of the vehicle;
    at least one tensioning system connected to the cover and connected to at least the at least one rear attachment assembly to tension the cover;
    at least one latching mechanism including at least one release member adapted to selectively unlatch the at least one rear attachment assembly from the vehicle, wherein unlatching the at least one release member allows selective further uncovering of the top cargo bed opening of the vehicle.

2. The tonneau cover assembly of claim 1, wherein the at least one tensioning system is a cable arrangement including a pair of cables coupled to respective sides of the cover and operably connected to opposite ends of the at least one rear attachment assembly.

3. The tonneau cover assembly of claim 1, wherein the at least one tensioning system is operably connected to a front attachment assembly adjacent a front of the top cargo bed opening of the vehicle.

4. The tonneau cover assembly of claim 2, wherein the cable on both sides of the cover additionally extend inboard to operably connect to a front attachment assembly for further tensioning adjacent a front of the top cargo bed opening of the vehicle.

5. The tonneau cover assembly of claim 4, further comprising at least one pair of springs connected to at least one fastener on the front attachment assembly, wherein each cable that runs inboard is operably connected to a respective spring of said at least one pair of springs for further cable tensioning.

6. The tonneau cover assembly of claim 1, wherein the cover is rollable to an open/stowed position and securable to a front attachment assembly.

7. The tonneau cover assembly of claim 1, further comprising at least one seal along at least both sides of the cover in a fore and aft direction adapted to provide a weather resistant seal against the vehicle.

8. The tonneau cover assembly of claim 1, further comprising at least one seal operably coupled to the rear attachment assembly and/or a front attachment assembly adapted to provide a weather resistant seal against the vehicle.

9. The tonneau cover assembly of claim 1, further comprising a plurality of cover management bows operably coupled to the cover running cross-vehicle, said plurality of cover management bows adapted to operably selectively engage with the vehicle adjacent the top cargo bed opening.

10. The tonneau cover assembly of claim 9, further comprising a plurality of pockets operably connected to opposing sides of the cover, wherein each end of the plurality of cover management bows is located within a respective pocket.

11. The tonneau cover assembly of claim 10, wherein the plurality of pockets is adapted to operably rest on sidewalls of the vehicle adjacent the top cargo bed opening of the vehicle.

12. The tonneau cover assembly of claim 1, wherein the second position creates a gap of about 3 to 10 inches for limited access into the top cargo bed opening of the vehicle.

13. The tonneau cover assembly of claim 1, further comprising a pair of mounting brackets, each mounting bracket adapted to be connected to the vehicle adjacent the top cargo bed opening of the vehicle by at least one fastener.

14. The tonneau cover assembly of claim 13, wherein the at least one release member includes at least one handle operably connected to a connecting bar, wherein pulling the at least one handle causes rotation of the connecting bar to unlatch a respective hook from each mounting bracket thereby unlatching the latching mechanism.

15. A tonneau cover assembly adapted for a vehicle cargo bed structure, comprising:
- a cover operably adapted for sealing a top opening of the vehicle when said tonneau cover assembly is in a closed position, wherein the cover is moveable between at least the closed position, a partially open position and a fully open position, said cover including fabric material;
- at least one tensioning system operably coupled to the cover to keep the cover under tension when in the closed position for sealing;
- a pair of mounting brackets, wherein the mounting brackets are adapted to be connected to opposite sidewalls of the vehicle adjacent the top opening of the vehicle with at least one fastener;
- a first recess formed in the pair of mounting brackets;
- a second recess formed in the pair of mounting brackets;
- a pair of rear attachment portions operably connected at both ends of a cross member, said pair of rear attachment portions including an end feature operable to selectively fit within the first recess;
- a pair of cutouts formed in the cross member;
- at least one release member including a pair of handles, each rotatable within the pair of cutouts, respectively, and, each operably connected to a connecting bar;
- a pair of release latches operably connected toward both ends of the connecting bar and rotatable with the connecting bar, wherein moving either of the handles in a first direction causes rotation of the connecting bar to rotate both release latches from the second recess of the mounting brackets thereby unlatching the pair of rear attachment portions from the mounting brackets in order to allow the cover to be selectively moved to the fully open position when desired, and wherein moving either of the handles in a second direction causes rotation of the connecting bar to rotate both release latches into the second recess of the mounting brackets thereby latching the pair of rear attachment portions to the mounting brackets to allow the cover to be selectively moved between the partially open and closed positions when desired; and
- a pivotal portion operably coupled to the cover and to the pair of rear attachment portions, wherein pivoting the pivotal portion moves the cover between the closed position and the partially open position to partially uncover the top opening of the vehicle.

16. The tonneau cover assembly of claim 15, further comprising a pair of front rail corner attachments operably connected to both ends of a front bow member, wherein the cover and the at least one tensioning system are operably coupled to at least the pair of front rail corner attachments.

17. The tonneau cover assembly of claim 16, wherein the at least one tensioning system comprises at least two cables each connected to a respective spring that is operably connected to the front bow member, wherein one end of each cable is connected to one of each of the pair of rear attachment portions, each cable extends through the respective front rail corner attachment, and the other end of each cable is connected to the respective spring.

18. The tonneau cover assembly of claim 15, further comprising at least one pair of seals, wherein the seals are operably connected to the underneath surface of the cover along both sides of the cover in the fore and aft direction adapted to seal against the vehicle's sidewalls.

19. The tonneau cover assembly of claim 15, further comprising at least one fabric management bow connected at opposite ends to a pocket, wherein each pocket is connected to the cover, and, wherein each pocket is adapted to be selectively operably located on the fore and aft sidewalls of the vehicle adjacent the top opening of the vehicle.

20. A tonneau cover assembly adapted for a vehicle that has a cargo bed structure with a top opening and a tailgate, comprising:
- a cover moveable between at least a closed position to cover the top opening, a partially open position and a fully open position;
- at least one tensioning system that is a cable system operable to tension the cover;
- at least one fabric management bow connected to the cover;
- a front attachment assembly operably connected to a front of the cover;
- a plurality of mounting brackets connected to a plurality of apertures located toward the upper sidewalls of the vehicle by a plurality of fasteners;
- a first recess formed in the plurality of mounting brackets;
- a second recess formed in the plurality of mounting brackets;
- a pair of rear attachment portions operably connected at both ends of a cross member, said pair of rear attachment portions including an end feature operable to selectively fit within the first recess;
- a pair of cutouts formed in the cross member;
- at least one release lever including a pair of handles, each rotatable within the pair of cutouts, respectively, and, each operably connected to a connecting bar;
- a pair of release latches operably connected toward both ends of the connecting bar and rotatable with the connecting bar, wherein moving either of the handles toward a first direction causes rotation of the connecting bar to rotate both release latches from the second recess of the plurality of mounting brackets thereby unlatching the pair of rear attachment portions from the plurality of mounting brackets in order to allow the cover to be selectively moved to the fully open position when desired, and wherein moving either of the handles toward a second direction causes rotation of the connecting bar to rotate both release latches into the second recess of the plurality of mounting brackets thereby latching the pair of rear attachment portions to the plurality of mounting brackets to allow the cover to be selectively moved between the partially open and closed positions when desired; and
- a pivotal portion operably coupled to a rear of the cover and to the pair of rear attachment portions, wherein pivoting the pivotal portion moves the cover between the closed position adapted for sealing engagement against the tailgate and the partially open position adapted to partially uncover the opening of the vehicle.

* * * * *